United States Patent
Hafner et al.

(10) Patent No.: US 9,751,416 B2
(45) Date of Patent: Sep. 5, 2017

(54) GENERATING ENERGY TRANSACTION PLANS

(75) Inventors: James Lee Hafner, San Jose, CA (US); Melissa Wiltsey O'Mara, Tully, NY (US); Paul Stuart Williamson, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1801 days.

(21) Appl. No.: 12/139,565

(22) Filed: Jun. 16, 2008

(65) Prior Publication Data
US 2009/0313033 A1 Dec. 17, 2009

(51) Int. Cl.
*G06Q 50/06* (2012.01)
*B60L 11/18* (2006.01)
(Continued)

(52) U.S. Cl.
CPC ........ *B60L 11/1824* (2013.01); *B60L 8/003* (2013.01); *B60L 11/1838* (2013.01);
(Continued)

(58) Field of Classification Search
CPC B60L 11/1824; B60L 11/184; B60L 11/1842; G06Q 50/06; Y02E 60/721;
(Continued)

(56) References Cited

U.S. PATENT DOCUMENTS

| 3,867,682 A | 2/1975 | Yamauchi et al. |
| 4,306,156 A | 12/1981 | Monaco et al. |

(Continued)

FOREIGN PATENT DOCUMENTS

| AU | 2003208173 | 9/2003 |
| JP | 2000279519 | 10/2000 |

(Continued)

OTHER PUBLICATIONS

U.S. Appl. No. 12/139,562, filed Jun. 16, 2008, Hafner et al.
(Continued)

*Primary Examiner* — Igor Borissov
(74) *Attorney, Agent, or Firm* — Yee & Associates, P.C.; Mercedes Hobson

(57) ABSTRACT

A computer implemented method, apparatus, and computer program product for generating an energy transaction plan to manage an electric vehicle charging transaction. The energy transaction planner identifies an electric vehicle associated with a charging station and a set of principals associated with a charging transaction for the electric vehicle. The charging transaction is a transaction associated with at least one of charging the electric vehicle, storing electric power in an electric storage mechanism associated with the electric vehicle, and de-charging the electric vehicle. The energy transaction planner receives charging transaction information. The charging transaction information comprises requirements, constraints, and preferences applicable to the charging transaction. The energy transaction planner generates an energy transaction plan based on the charging transaction information. The energy transaction plan comprises terms for governing all aspects of the charging transaction.

25 Claims, 9 Drawing Sheets

(51) Int. Cl.
*B60L 8/00* (2006.01)
*G06Q 10/06* (2012.01)
*G06Q 40/00* (2012.01)
*G07F 15/00* (2006.01)

(52) U.S. Cl.
CPC ....... *B60L 11/1842* (2013.01); *B60L 11/1846* (2013.01); *B60L 11/1848* (2013.01); *G06Q 10/0637* (2013.01); *G06Q 40/00* (2013.01); *G07F 15/005* (2013.01); *G07F 15/008* (2013.01); *B60L 2270/36* (2013.01); *Y02E 60/721* (2013.01); *Y02T 10/7005* (2013.01); *Y02T 10/7072* (2013.01); *Y02T 10/7083* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(58) Field of Classification Search
CPC ...... Y02T 90/14; Y02T 90/169; Y04S 10/126; Y04S 30/14
USPC .................................. 705/1.1, 35, 7.36, 412
See application file for complete search history.

(56) References Cited

U.S. PATENT DOCUMENTS

| | | |
|---|---|---|
| 4,351,405 A | 9/1982 | Fields et al. |
| 4,389,608 A | 6/1983 | Dahl et al. |
| 4,433,278 A | 2/1984 | Lowndes et al. |
| 4,532,418 A | 7/1985 | Meese et al. |
| 5,049,802 A | 9/1991 | Mintus et al. |
| 5,184,058 A | 2/1993 | Hesse et al. |
| 5,343,970 A | 9/1994 | Severinsky |
| 5,359,228 A | 10/1994 | Yoshida |
| 5,422,624 A | 6/1995 | Smith |
| 5,441,122 A | 8/1995 | Yoshida |
| 5,487,002 A | 1/1996 | Diller et al. |
| 5,492,189 A | 2/1996 | Kriegler et al. |
| 5,492,190 A | 2/1996 | Yoshida |
| 5,548,200 A | 8/1996 | Nor et al. |
| 5,563,491 A | 10/1996 | Tseng |
| 5,566,774 A | 10/1996 | Yoshida |
| 5,573,090 A | 11/1996 | Ross |
| 5,594,318 A | 1/1997 | Nor et al. |
| 5,627,752 A | 5/1997 | Buck et al. |
| 5,642,270 A | 6/1997 | Green et al. |
| 5,675,205 A | 10/1997 | Jacob et al. |
| 5,736,833 A | 4/1998 | Farris |
| 5,778,326 A | 7/1998 | Moroto et al. |
| 6,067,008 A | 5/2000 | Smith |
| 6,081,205 A | 6/2000 | Williams |
| 6,225,776 B1 | 5/2001 | Chai |
| 6,234,932 B1 | 5/2001 | Kuroda et al. |
| 6,252,380 B1 | 6/2001 | Koenck |
| 6,278,915 B1 | 8/2001 | Deguchi et al. |
| 6,285,931 B1 | 9/2001 | Hattori et al. |
| 6,301,531 B1 | 10/2001 | Pierro et al. |
| 6,307,349 B1 | 10/2001 | Koenck et al. |
| 6,373,380 B1 | 4/2002 | Robertson et al. |
| 6,434,465 B2 | 8/2002 | Schmitt et al. |
| 6,456,041 B1 | 9/2002 | Terada et al. |
| 6,466,658 B2 | 10/2002 | Schelberg, Jr. et al. |
| 6,480,767 B2 | 11/2002 | Yamaguchi et al. |
| 6,487,477 B1 | 11/2002 | Woestman et al. |
| 6,586,866 B1 | 7/2003 | Ikedo et al. |
| 6,609,582 B1 | 8/2003 | Botti et al. |
| 6,614,204 B2 | 9/2003 | Pellegrino et al. |
| 6,629,024 B2 | 9/2003 | Tabata et al. |
| 6,727,809 B1 | 4/2004 | Smith |
| 6,741,036 B1 | 5/2004 | Ikedo et al. |
| 6,766,949 B2 | 7/2004 | Terranova et al. |
| 6,789,733 B2 | 9/2004 | Terranova et al. |
| 6,794,849 B2 | 9/2004 | Mori et al. |
| 6,850,898 B1 | 2/2005 | Murakami et al. |
| 6,909,200 B2 | 6/2005 | Bouchon |
| 6,915,869 B2 | 7/2005 | Botti et al. |
| 7,013,205 B1 | 3/2006 | Hafner et al. |
| 7,027,890 B2 | 4/2006 | Wilson |
| 7,039,389 B2 | 5/2006 | Johnson, Jr. |
| 7,049,720 B2 | 5/2006 | Darday |
| 7,178,616 B2 | 2/2007 | Botti et al. |
| 7,216,729 B2 | 5/2007 | Syed et al. |
| 7,243,010 B2 | 7/2007 | Tabata et al. |
| 7,309,966 B2 | 12/2007 | Wobben |
| 7,402,978 B2 | 7/2008 | Pryor |
| 7,565,396 B2 | 7/2009 | Hoshina |
| 7,674,536 B2 | 3/2010 | Chipchase et al. |
| 7,693,609 B2 | 4/2010 | Kressner et al. |
| 7,698,078 B2 | 4/2010 | Kelty et al. |
| 7,715,593 B1 | 5/2010 | Adams et al. |
| 7,740,092 B2 | 6/2010 | Bender |
| 7,885,893 B2 | 2/2011 | Alexander |
| 7,949,435 B2 | 5/2011 | Pollack et al. |
| 7,956,570 B2 | 6/2011 | Lowenthal et al. |
| 7,991,665 B2 | 8/2011 | Hafner et al. |
| 8,054,048 B2 | 11/2011 | Woody et al. |
| 8,103,386 B2 | 1/2012 | Ichikawa et al. |
| 8,103,391 B2 | 1/2012 | Ferro et al. |
| 8,498,763 B2 | 7/2013 | Hafner et al. |
| 8,531,162 B2 | 9/2013 | Hafner et al. |
| 2002/0064258 A1 | 5/2002 | Schelberg, Jr. et al. |
| 2002/0153726 A1 | 10/2002 | Sumner |
| 2003/0137277 A1 | 7/2003 | Mori et al. |
| 2003/0153278 A1 | 8/2003 | Johnson, Jr. |
| 2003/0205619 A1 | 11/2003 | Terranova et al. |
| 2004/0046506 A1 | 3/2004 | Kawai et al. |
| 2004/0062059 A1 | 4/2004 | Cheng et al. |
| 2004/0265671 A1 | 12/2004 | Chipchase et al. |
| 2005/0008904 A1 | 1/2005 | Suppes |
| 2005/0024189 A1 | 2/2005 | Weber |
| 2005/0044245 A1 | 2/2005 | Hoshina |
| 2005/0231119 A1 | 10/2005 | Ito et al. |
| 2005/0234776 A1 | 10/2005 | Jacoves et al. |
| 2006/0182241 A1 | 8/2006 | Schelberg, Jr. et al. |
| 2006/0282381 A1 | 12/2006 | Ritchie |
| 2006/0287783 A1 | 12/2006 | Walker |
| 2007/0126395 A1 | 6/2007 | Suchar |
| 2007/0282495 A1 | 12/2007 | Kempton et al. |
| 2008/0039979 A1 | 2/2008 | Bridges et al. |
| 2008/0039989 A1 | 2/2008 | Pollack et al. |
| 2008/0040223 A1 | 2/2008 | Bridges et al. |
| 2008/0040295 A1 | 2/2008 | Kaplan et al. |
| 2008/0052145 A1 | 2/2008 | Kaplan et al. |
| 2008/0086411 A1 | 4/2008 | Olson et al. |
| 2008/0097904 A1 | 4/2008 | Volchek et al. |
| 2008/0155008 A1 | 6/2008 | Stiles et al. |
| 2008/0180027 A1 | 7/2008 | Matsushita et al. |
| 2008/0228613 A1 | 9/2008 | Alexander |
| 2008/0281663 A1 | 11/2008 | Hakim et al. |
| 2008/0312782 A1 | 12/2008 | Berdichevsky et al. |
| 2009/0021213 A1 | 1/2009 | Johnson |
| 2009/0030712 A1 | 1/2009 | Bogolea et al. |
| 2009/0043519 A1 | 2/2009 | Bridges et al. |
| 2009/0066287 A1 | 3/2009 | Pollack et al. |
| 2009/0076913 A1 | 3/2009 | Morgan |
| 2009/0082957 A1 | 3/2009 | Agassi et al. |
| 2009/0091291 A1 | 4/2009 | Woody et al. |
| 2009/0092864 A1 | 4/2009 | McLean et al. |
| 2009/0144001 A1 | 6/2009 | Leonard et al. |
| 2009/0174365 A1 | 7/2009 | Lowenthal et al. |
| 2009/0177580 A1 | 7/2009 | Lowenthal et al. |
| 2009/0210357 A1 | 8/2009 | Pudar et al. |
| 2009/0287578 A1 | 11/2009 | Paluszek et al. |
| 2009/0312903 A1 | 12/2009 | Hafner et al. |
| 2009/0313032 A1 | 12/2009 | Hafner et al. |
| 2009/0313034 A1 | 12/2009 | Ferro et al. |
| 2009/0313098 A1 | 12/2009 | Hafner et al. |
| 2009/0313103 A1 | 12/2009 | Ambrosio et al. |
| 2009/0313104 A1 | 12/2009 | Hafner et al. |
| 2009/0313174 A1 | 12/2009 | Hafner et al. |
| 2010/0017045 A1 | 1/2010 | Nesler et al. |
| 2010/0049396 A1 | 2/2010 | Ferro et al. |

(56) References Cited

U.S. PATENT DOCUMENTS

| | | | |
|---|---|---|---|
| 2010/0049533 | A1 | 2/2010 | Ferro et al. |
| 2010/0049610 | A1 | 2/2010 | Ambrosio et al. |
| 2010/0049639 | A1 | 2/2010 | Ferro et al. |
| 2010/0049737 | A1 | 2/2010 | Ambrosio et al. |
| 2010/0169008 | A1 | 7/2010 | Niwa et al. |
| 2011/0071923 | A1 | 3/2011 | Kende et al. |
| 2012/0191524 | A1 | 7/2012 | Ambrosio et al. |
| 2012/0221160 | A1 | 8/2012 | Hafner et al. |

FOREIGN PATENT DOCUMENTS

| | | |
|---|---|---|
| JP | 2000289355 | 10/2000 |
| JP | 2001359203 A | 12/2001 |
| JP | 2006262570 A | 9/2006 |
| WO | WO03075440 | 9/2003 |
| WO | WO2006057889 | 6/2006 |

OTHER PUBLICATIONS

U.S. Appl. No. 12/139,564, filed Jun. 16, 2008, Hafner et al.
U.S. Appl. No. 12/139,561, filed Jun. 16, 2008, Hafner et al.
U.S. Appl. No. 12/139,569, filed Jun. 16, 2008, Ferro et al.
U.S. Appl. No. 12/139,571, filed Jun. 16, 2008, Hafner et al.
U.S. Appl. No. 12/194,245, filed Aug. 19, 2008, Ferro et al.
U.S. Appl. No. 12/194,325, filed Aug. 19, 2008, Ferro et al.
U.S. Appl. No. 12/194,341, filed Aug. 19, 2008, Ambrosio et al.
U.S. Appl. No. 12/194,210, filed Aug. 19, 2008, Ambrosio et al.
U.S. Appl. No. 12/194,290, filed Aug. 19, 2008, Ferro et al.
U.S. Appl. No. 12/139,574, filed Jun. 16, 2008, Ambrosio et al.
U.S. Appl. No. 12/139,575, filed Jun. 16, 2008, Hafner et al.
USPTO office action for U.S. Appl. No. 12/139,569 dated Apr. 25, 2011.
USPTO office action for U.S. Appl. No. 12/139,571 dated Apr. 25, 2011.
USPTO office action for U.S. Appl. No. 12/139,575 dated Oct. 8, 2010.
USPTO office action for U.S. Appl. No. 12/194,210 dated Nov. 22, 2010.
Brooks, "State Unveils Plan to Help Drivers Recharge Their Electric Vehicles", Los Angeles Times, Los Angeles CA, Aug. 29, 1998, D1.
Wildman, "Gas-Free Nation", New York Times Magazine, New York, Apr. 20, 2008, p. 69.
USPTO office action for U.S. Appl. No. 12/194,341 dated Mar. 25, 2011.
USPTO final office action for U.S. Appl. No. 12/194,210 dated Mar. 25, 2011.
USPTO notice of allowance for U.S. Appl. No. 12/139,575 dated Mar. 8, 2011.
USPTO Notice of Allowance dated Sep. 14, 2011, for U.S. Appl. No. 12/194,325.
USPTO Office Action dated Jun. 20, 2011, for U.S. Appl. No. 12/194,325.
USPTO Office Action dated Jul. 11, 2011, for U.S. Appl. No. 12/139,561.
USPTO office action for U.S. Appl. No. 12/194,290 dated Jun. 4, 2010.
Non-final office action dated May 26, 2010 regarding U.S. Appl. No. 12/048,183, 14 pages.
Notice of allowance dated Dec. 10, 2010 regarding U.S. Appl. No. 12/048,183, 10 pages.
Non-final office action dated Aug. 16, 2005 regarding U.S. Appl. No. 10/992,840, 9 pages.
Notice of allowance dated Dec. 1, 2005 regarding U.S. Appl. No. 10/992,840, 8 pages.
International search report dated Jan. 3, 2007 regarding application PCT/US2005/041688, 1 page.
Boujelelben et al., "Evaluation and optimization of a hybrid urban Microbus," IEEE Conference on Electric and Hybrid Vehicles, Dec. 2006, pp. 1-8.
Cikanek et al., "Control System and Dynamic Model Validation for a Parallel Hybrid Electric Vehicle," Proceedings of the 1999 American Control Conference, vol. 2, Jun. 1999, pp. 1222-1227.
De Breucker et al., "Grid Power Quality Improvements Using Grid-Coupled Hybrid Electric Vehicles PEMD 2006," The 3rd IET International Conference on Power Electronics, Machines and Drives, Mar. 2006, pp. 505-509.
Gonder et al., "Energy Management Strategies for Plug-In Hybrid Electric Vehicles," 2007 SAE World Congress, Apr. 2007, 13 pages.
Markel et al., "Plug-in Hybrid Electric Vehicle Energy Storage System Design," Advanced Automotive Battery Conference, May 2006, 13 pages.
O'Keefe et al., "Dynamic Programming Applied to Investigate Energy Management Strategies for a Plug-in HEV," 22nd International Battery, Hybrid and Fuel Cell Electric Vehicle Symposium and Exhibit, Oct. 2006, 15 pages.
Piccolo et al., "Fuzzy Logic Based Optimal Power Flow Management in Parallel Hybrid Electric Vehicles," Iranian Journal of Electrical and Computer Engineering, vol. 4, No. 2, Summer-Fall 2005, pp. 83-93.
Short et al., "A Preliminary Assessment of Plug-In Hybrid Electric Vehicles on Wind Energy Markets," Technical Report NREL/TP-620-39729, National Renewable Energy Laboratory, Apr. 2006, 41 pages.
Zhonghao et al., "Research on Modeling and Simulation of Hybrid Electric Vehicle Energy Control Systems," Proceedings of the Eighth International Conference on Electrical Machines and Systems, vol. 1, Sep. 2005, 4 pages.
Non-final office action dated Aug. 17, 2012 regarding U.S. Appl. No. 13/431,539, 17 pages.
Hafner et al., U.S. Appl. No. 13/430,864, filed Mar. 27, 2012, 55 pages.
Ambrosio et al., U.S. Appl. No. 13/431,539, filed Mar. 27, 2012, 66 pages.
Final office action dated Jul. 15, 2013 regarding U.S. Appl. No. 12/194,341, 22 pages.
Final office action dated Jan. 16, 2013 regarding U.S. Appl. No. 13/431,539, 11 pages.
Notice of allowance dated Nov. 16, 2012 regarding U.S. Appl. No. 12/139,564, 10 pages.
Galdi et al., "Multi-Objective Optimization for Fuel Economy and Emissions of HEV Using the Goal-Attainment Method," EVS 18, 2001, 12 pages.
USPTO Notice of Allowance, U.S. Appl. No. 12/139,561, Mar. 14, 2013, 5 pages.
USPTO Notice of Allowance, U.S. Appl. No. 12/139,564, May 6, 2013, 8 pages.
USPTO Non-Final Office Action, U.S. Appl. No. 12/139,564, Mar. 18, 2013, 17 pages.
USPTO Office Action dated Oct. 6, 2010, regarding U.S. Appl. No. 12/139,561, 10 pages.
USPTO Office Action dated Jan. 7, 2011, regarding U.S. Appl. No. 12/139,561, 9 pages.
USPTO Office Action dated Feb. 2, 2012, regarding U.S. Appl. No. 12/139,561, 12 pages.
USPTO Office Action dated Oct. 3, 2011, regarding U.S. Appl. No. 12/139,562, 65 pages.
USPTO Final Office Action dated Feb. 7, 2012, regarding U.S. Appl. No. 12/139,562, 47 pages.
USPTO Office Action dated Jan. 5, 2012, regarding U.S. Appl. No. 12/139,564, 26 pages.
USPTO Final Office Action dated Oct. 19, 2011, regarding U.S. Appl. No. 12/139,569, 35 pages.
USPTO Final Office Action dated Oct. 14, 2011, regarding U.S. Appl. No. 12/139,571, 36 pages.
USPTO Notice of Allowance dated Jan. 19, 2012, regarding U.S. Appl. No. 12/139,574, 38 pages.
Appeal Brief dated Aug. 24, 2011, regarding U.S. Appl. No. 12/194,210, 35 pages.

(56) References Cited

OTHER PUBLICATIONS

USPTO Examiner's Answer dated Nov. 2, 2011, regarding U.S. Appl. No. 12/194,210, 21 pages.
Reply Brief dated Dec. 21, 2011, regarding U.S. Appl. No. 12/194,210, 15 pages.
USPTO Office Action dated Nov. 18, 2011, regarding U.S. Appl. No. 12/194,245, 40 pages.
USPTO Final Office Action dated Nov. 29, 2010, regarding U.S. Appl. No. 12/194,290, 10 pages.
Appeal Brief dated May 2, 2011, regarding U.S. Appl. No. 12/194,290, 57 pages.
USPTO Examiner's Answer dated Jul. 6, 2011, regarding U.S. Appl. No. 12/194,290, 24 pages.
Reply Brief dated Sep. 6, 2011, regarding U.S. Appl. No. 12/194,290, 9 pages.
USPTO Final Office Action dated Oct. 17, 2011, regarding U.S. Appl. No. 12/194,341, 15 pages.
Office Action, dated Mar. 1, 2012, regarding U.S. Appl. No. 12/139,562, 8 pages.
Notice of Allowance, dated Apr. 30, 2012, regarding U.S. Appl. No. 12/139,574, 17 pages.
Final Office Action, dated May 11, 2012, regarding U.S. Appl. No. 12/194,245, 32 pages.
Ackerman, "Hybrid Vehicle Cruises for Battle," SIGNAL Magazine, Apr. 2004, 4 pages, accessed Jan. 9, 2013 http://www.afcea.org/content/?q=node/91.
Renault, "Kangoo reinvents the electric car," Renault press release, Mar. 2003, 3 pages.
L3 Research, Enigma Hybrid Specifications, L3 Research, Inc., copyright 2003, 1 page, accessed Jan. 9, 2013 http://www.l3research.com/vehicles/enigma/specifications.htm.
Suppes, "Plug-in Hybrid with Fuel Cell Battery Charger," International Journal of Hydrogen Energy, vol. 30, Issue 2, Feb. 2005, pp. 113-121.
Powers, "PHEV," About, Inc., copyright 2005, New York Times Company, 1 pages, accessed Jan. 9, 2013 http://web.archive.org/web/20051231074047/http://hybridcars.about.com.
"Plug-In Hybrids," hybridcars.com, copyright 2005, 2 pages, accessed Jan. 9, 2013 http://web.archive.org/web/20050310125208/http://www.hybridcars.com.
"All About Plug-In Hybrids (PHEVs)," CalCars, California Car Initiative, Copyright 2012, 4 pages, accessed Jan. 9, 2013 http://www.calcars.org/vehicles.html.
Notice of Allowance, dated May 9, 2014, regarding U.S. Appl. No. 13/431,539, 24 pages.
Office Action, dated Apr. 24, 2014, regarding U.S. Appl. No. 12/139,569, 80 pages.
Office Action, dated Apr. 23, 2014, regarding U.S. Appl. No. 12/139,571, 84 pages.
Office Action, dated Aug. 7, 2014, regarding U.S. Appl. No. 12/139,569, 54 pages.
Office Action, dated Aug. 5, 2014, regarding U.S. Appl. No. 12/139,571, 48 pages.
Office Action, dated Jul. 2, 2014, regarding U.S. Appl. No. 12/139,562, 110 pages.
Notice of Allowance dated Aug. 14, 2014, regarding U.S. Appl. No. 12/194,290, 7 pages.
Final Office Action, dated Oct. 31, 2014, regarding U.S. Appl. No. 12/139,562, 76 pages.
Office Action, dated Mar. 23, 2015, regarding U.S. Appl. No. 12/139,562, 90 pages.
Final Office Action, dated Jul. 20, 2015, regarding U.S. Appl. No. 12/139,562, 113 pages.
Final Office Action, dated Nov. 28, 2014, regarding U.S. Appl. No. 12/139,569, 71 pages.
Final Office Action, dated Nov. 26, 2014, regarding U.S. Appl. No. 12/139,571, 61 pages.
Office Action, dated Jul. 28, 2016, regarding U.S. Appl. No. 13/430,864, 84 pages.
Notice of Allowance, dated Aug. 11, 2014, regarding U.S. Appl. No. 12/194,210, 7 pages.

GENERATING ENERGY TRANSACTION PLANS

BACKGROUND OF THE INVENTION

1. Field of the Invention

The present invention is related generally to an improved data processing system, and in particular, to a method and apparatus for managing electric vehicle charging transactions. More particularly, the present invention is directed to a computer implemented method, apparatus, and computer usable program code for generating an energy transaction plan for controlling the charging of an electric vehicle, de-charging of the electric vehicle, and/or storing of electric power in the electric vehicle.

2. Description of the Related Art

Electric vehicles (EV) can be divided into two categories: totally electric vehicles (TEV) and plug-in hybrid electric vehicles (PHEV). Plug-in hybrid vehicles utilize two or more power sources to drive the vehicle. With the increasing costs of fossil fuels and concern over reliance on non-renewable resources, electric vehicles are poised to become a critical component of transportation systems throughout the world. Gasoline powered vehicles utilize the explosive power of a mixture of gasoline and air to propel the vehicle. In contrast, electric vehicles rely in whole or in part on electric power to drive the vehicle.

Electric vehicles contain electric storage mechanisms, such as batteries, to store electricity until it is needed to power the electric vehicle. The electric storage mechanisms require periodic charging to replenish the electric charge for continued operation. The electricity used to charge the electric storage mechanisms may be provided by any type of on-vehicle power generation and charging mechanism. The on-vehicle power generation and charging mechanisms may include consumptive power generation systems and/or non-consumptive power generation systems, such as, without limitation, fuel cells, gasoline powered combustion engines, bio-diesel powered engines, solar powered generators and regenerative braking systems.

In totally electric vehicles and plug-in hybrid electric vehicles, charging of the electric vehicles can also be accomplished by plugging the electric vehicle into an off-vehicle charging station. The off-vehicle charging station provides an external source of electricity, such as, an electric power grid. Totally electric vehicles require this type of off-vehicle charging in all cases. Off-vehicle charging is also likely to be significantly less expensive for plug-in hybrid electric vehicles than on-vehicle charging given currently available technology. Consequently off-vehicle charging may be the preferred charging mode for electric vehicle owners.

The power stored in the electric storage mechanisms on the electric vehicles and on-vehicle power generation mechanisms may be used to provide electricity back to the electricity grid. For electric vehicles to be used as suppliers of electric power to an electric power grid, electric vehicles are connected to an off-vehicle infrastructure which can efficiently consume the electricity generated or stored by the electric vehicle. To date, electric vehicle manufacturers and electric electric power provider companies have only planned and provided infrastructure and methods for the most rudimentary charging scenario in which the electric vehicle is plugged into a common electric outlet.

BRIEF SUMMARY OF THE INVENTION

According to one embodiment of the present invention, a computer implemented method, apparatus, and computer program product for generating an energy transaction plan to manage an electric vehicle charging transaction is provided. The energy transaction planner identifies an electric vehicle associated with a charging station and a set of principals associated with a charging transaction for the electric vehicle. A principal in the set of principals is an entity having an interest in the charging transaction for the electric vehicle. The charging transaction is a transaction associated with at least one of charging the electric vehicle, storing electric power in an electric storage mechanism associated with the electric vehicle, and de-charging the electric vehicle. The energy transaction planner receives charging transaction information. The charging transaction information comprises requirements, constraints, and preferences applicable to the charging transaction. The energy transaction planner generates an energy transaction plan based on the charging transaction information. The energy transaction plan comprises an identification of the electric vehicle, an identification of a principal in the set of principals to pay for the charging transaction, an identification of at least one utility associated with the charging transaction, an owner of the charging station, net financial results, charging transaction time driven event sequences, and terms of the charging transaction.

The charging transaction information may include a set of preferences for the set of principals, current state information, and device capabilities information. The set of preferences comprises a subset of preferences for each principal in the set of principals. A preference in the set of preferences specifies a parameter of the charging transaction that is to be minimized, maximized, or optimized. The charging transaction information comprises current state information describing a current state of one or more devices associated with the electric vehicle and the charging station. The charging transaction information comprises device capabilities information, wherein the device capabilities information describes the capabilities of devices associated with at least one of the electric vehicle and the charging station.

The charging transaction time driven event sequences may include information identifying time intervals for at least one of charging the electric vehicle, discharging the electric vehicle, storing electricity in the electric vehicle, and rates of electricity flow between the charging station and the electric vehicle during the charging of the electric vehicle or discharging of the electric vehicle.

The net financial results of the charging transaction indicate parties that will get paid, amounts of payments to be made, the amount of electricity provided to the electric vehicle from the electric grid, and the amount of electricity provided to an electric grid from the electric vehicle. The energy transaction plan may also optionally include incentive information. An incentive may be, without limitation, a coupon, a discount, a rebate, reward points, benefits, and/or cash back.

In another embodiment, a computer implemented method of generating an energy transaction plan for governing an electric vehicle charging transaction is provided. The energy transaction planner identifies an electric vehicle associated with a charging station and a set of principals associated with a charging transaction for the electric vehicle. The energy transaction planner receives a set of preferences for the set of principals. The energy transaction planner generates an energy transaction plan based on the set of preferences. The energy transaction plan comprises a set of terms for governing aspects of the charging transaction based on the set of preferences. The charging transaction is implemented and completed in accordance with the terms of the charging transaction.

The energy transaction planner may also receive device capabilities information for the electric vehicle and the charging station and current state information. In this embodiment, the energy transaction plan is generated based on the set of preferences, the device capabilities information, and the current state information. The energy transaction plan is generated based on the set of preferences and the current state information.

In another embodiment, the energy transaction planner sends a request for the set of preferences to a set of energy preference services. The set of energy preference services sends preferences for the set of principals that are responsive to the request to the energy transaction planner to form the set of preferences. Each preference in the set of preferences may be is associated with a weighting value. The energy transaction planner may identify the weighting value associated with each preference in the set of preferences and generate the energy transaction plan to maximize, minimize or optimize each preference in the set of preferences in accordance with the weighting value. The weighting value indicates a priority of each preference relative to other preferences in the set of preferences.

In another embodiment, the energy transaction plan comprises an identification of the electric vehicle, an identification of a principal in the set of principals to pay for the charging transaction, an identification of at least one utility associated with the charging transaction, an owner of the charging station, charging transaction time driven event sequences, and terms of the charging transaction.

DETAILED DESCRIPTION OF THE INVENTION

Figure 1:
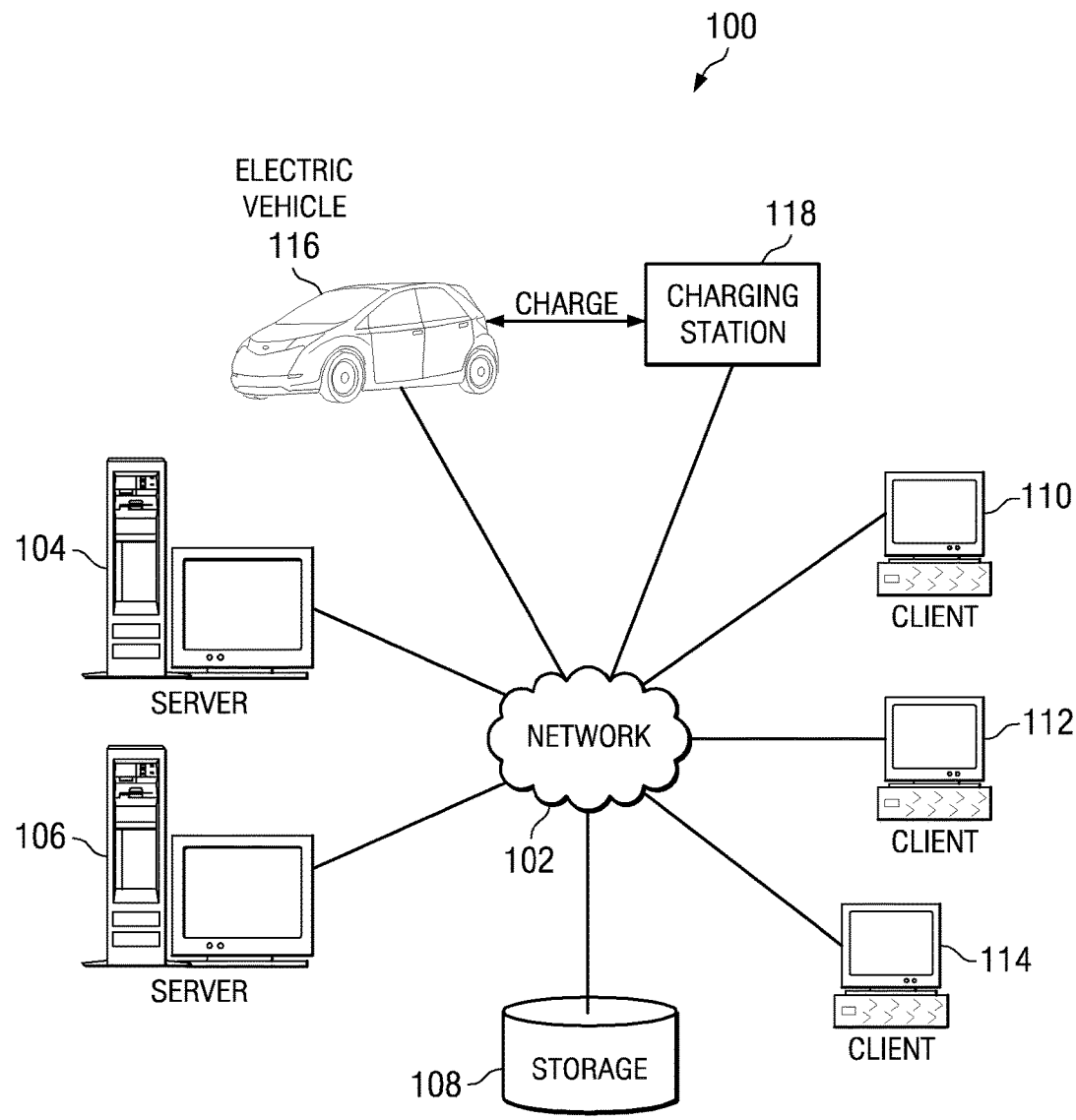
FIG. 1 is a block diagram of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wired, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
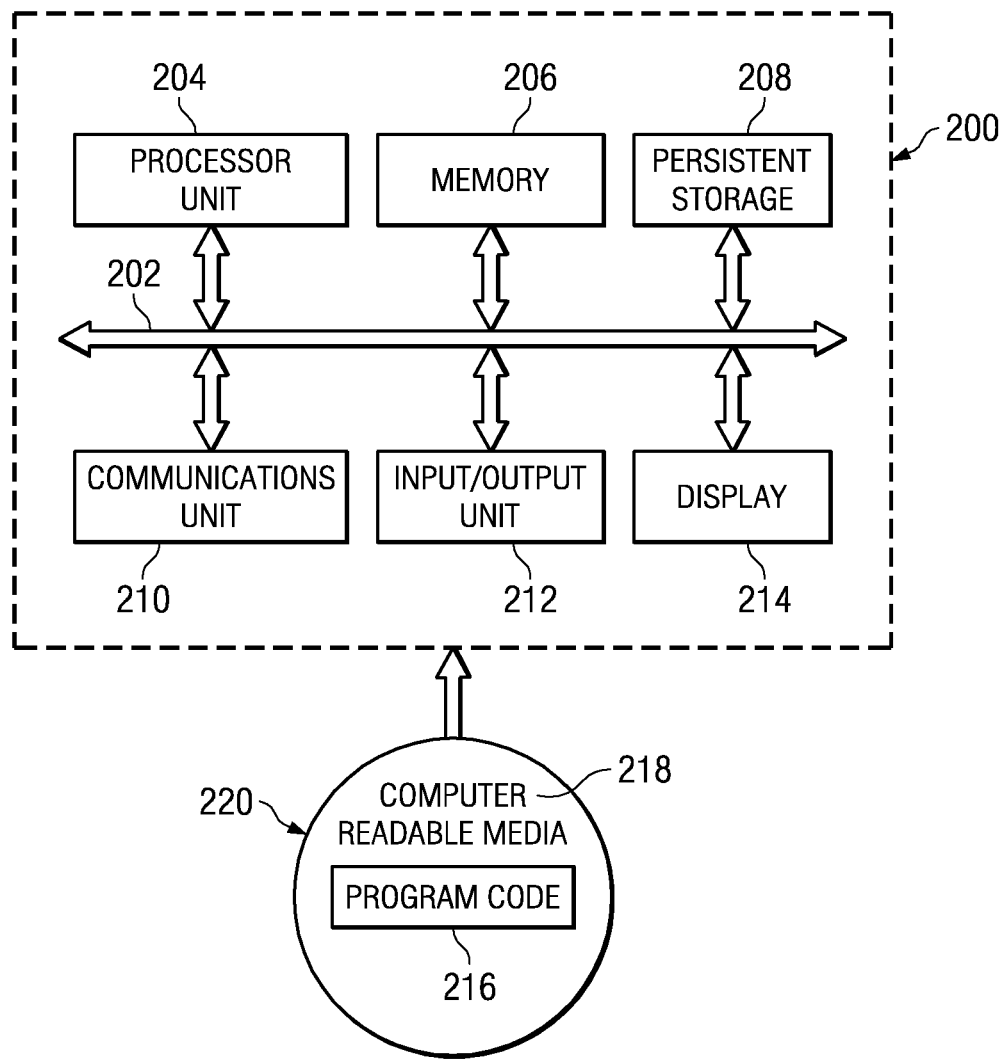
FIG. 2 is a block diagram of a data processing system in which illustrative embodiments may be implemented.

With reference now to the figures, and in particular, with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing system in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Electric vehicle 116 is any vehicle that utilizes electric power in whole or in part to drive the vehicle that is capable of being plugged into charging station 118. Electric vehicle 116 may be a totally electric vehicle or a plug-in hybrid electric vehicle. The plug-in electric hybrid vehicle may be a gasoline/electric hybrid, a natural gas/electric hybrid, a diesel/electric hybrid, a biodiesel/electric hybrid, or any other type of plug-in electric hybrid. Electric vehicle 116 may optionally include an on-vehicle power generation mechanism such as, but without limitation, solar power electric generators, gasoline powered electric generators, biodiesel powered electric generator, or any other type of on-vehicle electric power generation mechanism.

Charging station 118 is any station, kiosk, garage, power outlet, or other facility for providing electricity to electric vehicle 116. Electric vehicle 116 receives electricity from, or provides electricity to, an electric grid at charging station 118. In other words, electric charge may flow from an electric grid through charging station 118 to electric vehicle 116 or the electric charge may flow from electric vehicle 116 back into the electric grid through charging station 118. Charging station 118 is a selected charge/discharge site, such as an outlet or kiosk, for providing electric vehicle 116 with access to the electric grid. For example, and without limitation, charging station 118 may be a power outlet in a privately owned garage, an electric outlet in a docking station in a commercially owned electric vehicle charging kiosk, or a power outlet in a commercially owned garage.

Electric vehicle 116 connects to charging station 118 via an electrical outlet or other electricity transfer mechanism. The electricity may also be optionally transferred via wireless energy transfer, also referred to as wireless power transfer, in which electrical energy is transferred to a load, such as electric vehicle 116, without interconnecting wires. The electricity may flow from charging station 118 into electric vehicle to charge electric vehicle 116. The electricity may also flow from electric vehicle 116 into charging station 118 to sell electricity back to the power grid.

Electric vehicle 116 and charging station 118 are optionally connected to network 102. Electric vehicle 116 and charging station 118 send and receive data associated with the charging of electric vehicle, the capabilities of electric vehicle, the capabilities of charging station 118, the current charge stored in electric vehicle, the rate of charging electric vehicle, the price of electricity received from a power grid, identity of the owner and/or operator of electric vehicle 116 and/or any other data relevant to charging or de-charging electric vehicle 116 over network 102.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. Data processing system 200 may also be implemented as a computing device on-board an electric vehicle, such as electric vehicle 116 in FIG. 1.

In this illustrative example, data processing system 200 includes communications fabric 202, which provides communications between processor unit 204, memory 206, persistent storage 208, communications unit 210, input/output (I/O) unit 212, and display 214. Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. In another example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to present information to a user. Information may be presented in a visual or graphical format on a display, in an audio format, presented as a combination of audio and visual content, presented in a raised format that can be read by the blind, or in any other format.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Currently, electric vehicle manufacturers and electric utility companies have only planned and provided infrastructure for the most rudimentary charging scenarios, such as, merely plugging the electric vehicle into a common electric outlet that is owned by the owner and operator of the electric vehicle. The illustrative embodiments recognize that charging electric vehicles will frequently be conducted under much broader and more complex sets of circumstances than this simple scenario and infrastructure is needed to accommodate these complex transactions. For example, owners and operators of electric vehicles will frequently be required to charge their electric vehicle at a charging station that is remote from the home of the electric vehicle owner. In most circumstances, it is unlikely that the electric vehicle owner will own the off-vehicle charging stations from which the owner obtains electricity to recharge the electric vehicle. In such a situation, the owner or operator of the electric vehicle will likely be required to pay for the charge obtained from the off-vehicle charging station.

The illustrative embodiments recognize that the charging transactions by which electric vehicles obtain electricity from an off-vehicle charging station to charge the electric vehicle requires a much more complete, flexible, and interoperable system governing all aspects of the charging transaction. Electric vehicle charging transactions can be divided into the pre-charge phase, the charge phase, and the post-charge phase. During the pre-charge phase of decision enablement, a charging plan is generated and all parties are presented with the conditions governing the charging transaction. During the charging phase, electricity flows to, from, or is stored in the electric vehicle. Finally, during the post-charge phase of the transaction, an analysis is performed to provide incentives and induce specific behaviors on the part of any party involved in the transaction. Additional charging infrastructure may also be provided to meter electricity at the point of charge, identify the various parties involved in the transaction, and provide flexible business rules governing the flow of funds between those parties.

Figure 3:
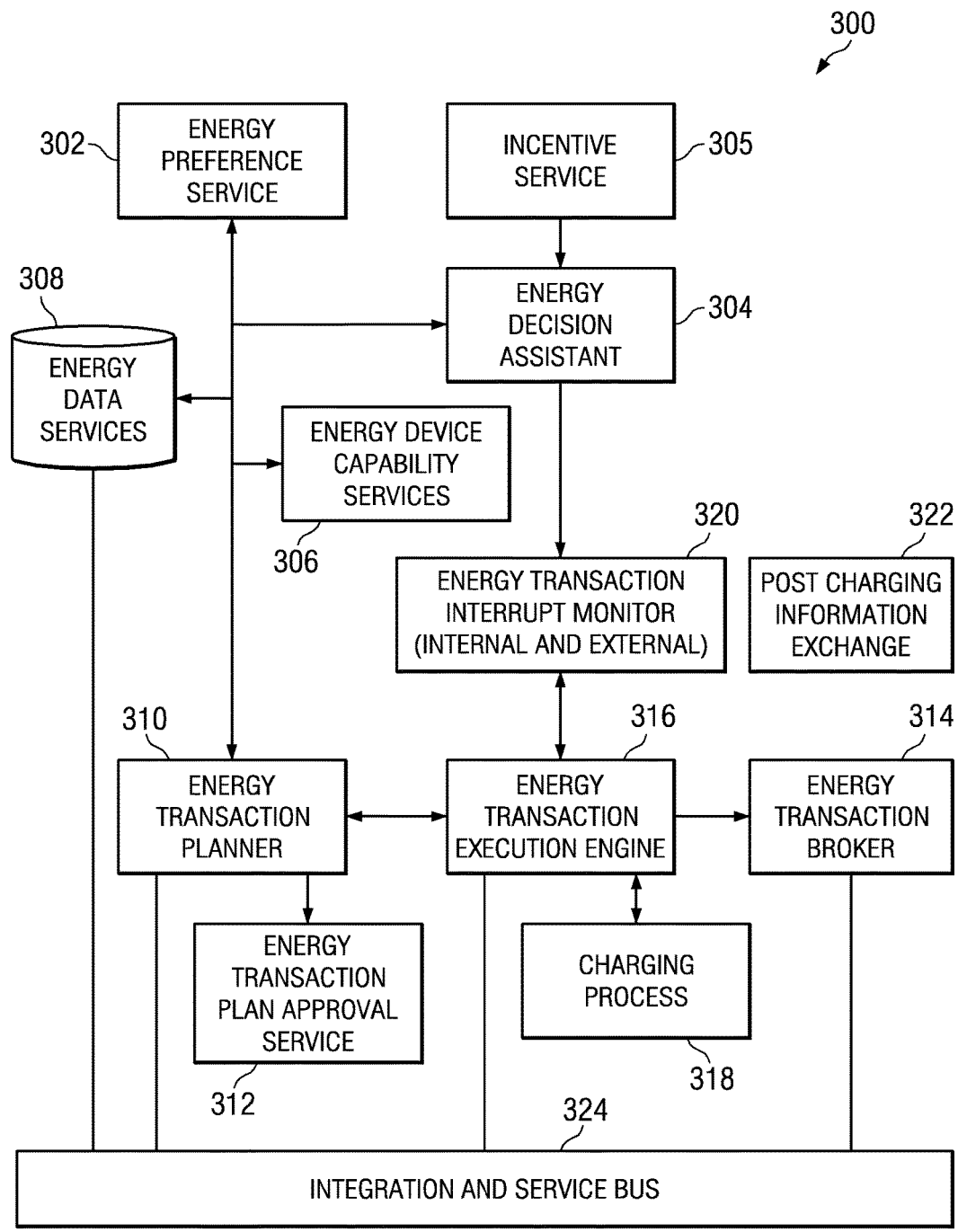
FIG. 3 is a block diagram of an energy transaction infrastructure in accordance with an illustrative embodiment.

FIG. 3 is a block diagram of an energy transaction infrastructure in accordance with an illustrative embodiment. Electric vehicle energy transaction infrastructure 300 is a charging infrastructure for managing all phases of an electric vehicle charging transaction. During the pre-charge phase, all parties of the transaction are presented with the conditions governing the charging transaction. The parties may include, without limitation, the owner of the electric vehicle to be charged, the operator of the electric vehicle, the owner of the charging station, and an electric utility company providing electricity to an electric power grid associated with the charging station. Parties agree to conditions relevant to their role in the transaction prior to the charge commencing. There may be many special circumstances in the terms and conditions which are presented in standard formats which are universally understood and which can be readily communicated and agreed upon by all parties.

During the pre-charge phase, electric vehicle energy transaction infrastructure 300 utilizes energy preference service 302, energy decision assistant 304, energy device capability services 306, energy data services 308, energy transaction planner 310, and optionally, energy transaction plan approval service 312 to generate a plan governing the charging transaction to the parties involved in the transaction.

Energy preference service 302 is a software component that generates, stores, and retrieves preference information associated with an electric vehicle and the preference information associated with the parties to the transaction. Preferences may include, without limitation, a maximum price per kilowatt hour of electricity to be paid by a party, a location where charging may occur, a location where charging may not occur, a rate of charging the electric vehicle, a minimum amount of charge, or any other preferences associated with charging an electric vehicle. The preferences may be pre-generated by one or more of the parties to the transaction.

Energy decision assistant 304 is an optional service that provides real-time options and trade-offs for a particular trip. For example, energy decision assistant 304 may monitor available incentives, weather conditions, a travel route, traffic information, and other real-time data to identify the best electric vehicle charging options for a particular trip.

Incentive service 305 receives offers of incentives from third party vendors. The incentives may be offers of discounts, rebates, rewards, and/or other incentives associated with charging an electric vehicle to encourage an operator of the electric vehicle to perform one or more behaviors associated with charging the electric vehicle. For example, and without limitation, an incentive may offer to charge the electric vehicle for free at a particular charging station if the owner or operator of the electric vehicle purchases one or more products from the third party vendor. Incentives service 305 provides information describing current incentives to energy transaction planner 310. In one embodiment, incentives service 305 provides the information describing the incentives to energy decision assistant 304. Energy decision assistant 304 then provides the incentives information to energy transaction planner 310.

Energy device capability service 306 is a software component that identifies and validates device capabilities. For example, and without limitation, energy device capability service 306 may include information describing the charging capabilities of the charging station, the charging requirements of the electric vehicle, the maximum storage capacity of the electric vehicle on-vehicle storage mechanisms, the existing amount of charge in the electric vehicle, the number of amps of electricity the charging station is capable of providing, and any other information associated with the capabilities and requirements of the electric vehicles and the charging station.

Energy data services 308 are a set of one or more third party data sources providing information relevant to the energy transaction. Energy data services 308 may include, without limitation, weather information sources, traffic information sources, map and travel information sources, charging station price information sources, or any other third party information sources.

Energy transaction planner 310 is an application that creates a transaction plan for governing electric vehicle charging transactions based on preferences of one or more principals. Energy transaction plan approval service 312 approves the transaction plan and validates with energy transaction broker 314. Energy transaction plan approval service 312 may be required to notify one or more parties of the terms of the transaction and obtain approval of one or more of the terms from the party. For example, and without limitation, if an operator of the electric vehicle is not the owner of the electric vehicle, energy transaction plan approval service 312 may require approval from the owner of the vehicle before allowing the vehicle to receive power at a charging station if the charging station and/or a utility will charge the owner of the electric vehicle a fee for the charging transaction. A utility refers to a provider of electric power. A utility typically provides electric power to a charging station via an electric power grid.

In this example, the charging phase begins when energy transaction execution engine 316 sends the transaction plan generated by energy transaction planner 310 for approval by energy transaction plan approval service 312, initiates the request to begin charging the electric vehicle, monitors and logs the health and safety of charging process 318, and receives requests from energy transaction interrupt monitor 320. During charging process 318, electricity flows into the electric vehicle or out of the electric vehicle and back into the power grid. Energy transaction interrupt monitor 320 monitors data transmissions to detect interrupt conditions that may terminate the flow of electric power to or from a vehicle. The interrupts may originate from the power grid, suppliers, and/or vehicles. For example, if a price of energy exceeds a predefined threshold in violation of a user-selected preference, energy transaction interrupt monitor 320 detects this interrupt condition and initiates appropriate actions to handle the cessation of electric power flow to the electric vehicle.

Energy transaction broker 314 supports settling an electric vehicle charging and discharge transaction independent of electricity supplier, parking space supplier, electrical infrastructure supplier, taxing authority, incentive provider, or other interested party. Elements include pricing schedules, time based pricing, facility recovery, tax collection, incentives, and/or fixed plans. Energy transaction broker 314 may also be used by energy transaction approval service 312 to validate the financial elements of the energy transaction plan prior to plan approval and prior to charging the electric vehicle.

The post-charge phase comprises analysis of the completed energy transaction to provide incentives, redeem credits or benefits, and induce specific behaviors by one or more parties involved in the charging transaction. The post-charge phase also includes payment of the appropriate parties for the energy transaction in accordance with the energy transaction plan governing the transaction. Various programs may be available to incent specific behaviors on the part of consumers. For example, a vehicle owner or user may receive reduced electricity rates if vehicle charging is conducted during off-peak times, such as during the night rather than during daylight hours when electricity usage is higher. Post charging information exchange 322 accumulates data pertinent to these incentives or redemption programs, authenticates the incentives data, and analyzes the incentives data to identify the most effective business process and optimize incentives for the parties.

During this charging phase, payment or fees for the charge are also recorded. Operational and financial parameters are conveyed for an optimum charge to occur. For example, a dynamic representation of an electric vehicle capability to consume charge should be understood at all times during the charging process to ensure the vehicle is not damaged or that the protections of the charging system are preserved. Electricity metering of the power flow may also be conducted and reported. Standards representing the acceptable charging voltage and amperage ranges, for example may be communicated and maintained for a safe charging transaction to occur. All data pertinent to the financial transaction is conveyed and recorded.

The components shown in FIG. 3 may be implemented on a data processing system associated with an electric vehicle. In such case, the components communicate and transfer data using integration and service bus 324. Integration and service bus 324 is an internal communication system within the electric vehicle, such as any wired or wireless communications system. A wired communications system includes, without limitation, a data bus or a universal serial bus (USB). If one or more components shown in FIG. 3 are located remotely, the components may transfer data using any type of wired or wireless network connection to connect to a network, such as network 102 in FIG. 1. A wireless network connection may be implemented over a cell-phone network, satellite, two-way radio, WiFi networks, or any other type of wireless network.

Presently, current processes for charging electric vehicles involve connecting the electric vehicle directly to a conventional electrical outlet. These methods provide no mechanism for establishing and enforcing the terms surrounding the electric vehicle charging transaction. The embodiments recognize that these limited methods severely restrict the conditions under which an electric vehicle charge can occur. For example, charge/discharge outlet site owners, such as outlets at a charging station, will likely restrict access to charging station facilities if the owners are not assured of reimbursement for the electricity consumed by one or more electric vehicles.

According to one embodiment of the present invention, a computer implemented method, apparatus, and computer program product for generating an energy transaction plan to manage an electric vehicle charging transaction is provided. The energy transaction planner identifies an electric vehicle associated with a charging station and a set of principals associated with a charging transaction for the electric vehicle. As used herein, the term "set" refers to a set of one or more. Thus, the set of principals may include a single principal, as well as two or more principals. A principal in the set of principals is an entity having an interest in the charging transaction for the electric vehicle.

The charging transaction is a transaction associated with at least one of charging the electric vehicle, storing electric power in an electric storage mechanism associated with the electric vehicle, and de-charging the electric vehicle. The energy transaction planner receives charging transaction information. The charging transaction information is information describing the set of principals, devices associated with the electric vehicle, devices associated with one or more charging stations, the preferences of the set of principals, and any other information relevant to the charging transaction. The charging transaction information may include requirements, constraints, and preferences applicable to the charging transaction. For example, the charging transaction information may include, without limitation, a set of preferences for the set of principals, information describing a current state of devices associated with the electric vehicle and/or the charging station, and/or information describing the capabilities of the devices associated with the electric vehicle and/or the charging station. The set of preferences comprises a subset of preferences for each principal in the set of principals. A preference in the set of preferences specifies a parameter of the charging transaction that is to be minimized, maximized, or optimized. A parameter of the charging transaction is any feature of the charging transaction, such as, without limitation, a rate of charging, a length of time for charging, a time to begin charging, a time to cease charging, a maximum level of charge, a minimum level of charge, or any other aspect of the charging transaction.

It will be appreciated by one skilled in the art that the words "optimize", "optimization" and related terms are terms of art that refer to improvements in speed, efficiency, accuracy, quality, and/or improvement of one or more parameters of electric vehicle charging transactions, and do not purport to indicate that any parameter of the charging transaction has achieved, or is capable of achieving, an "optimal" or perfectly speedy, perfectly efficient, and/or completely optimized.

The current state information may describe a current state of one or more devices associated with at least one electric vehicle and/or at least one charging station. The device capabilities information describes the capabilities of devices associated with at least one of the electric vehicle and/or at least one charging station.

The energy transaction planner generates an energy transaction plan based on the charging transaction information. The energy transaction plan comprises an identification of the electric vehicle, an identification of a principal in the set of principals to pay for the charging transaction, an identification of at least one utility associated with the charging transaction, an owner of the charging station, and terms of the charging transaction.

Figure 4:
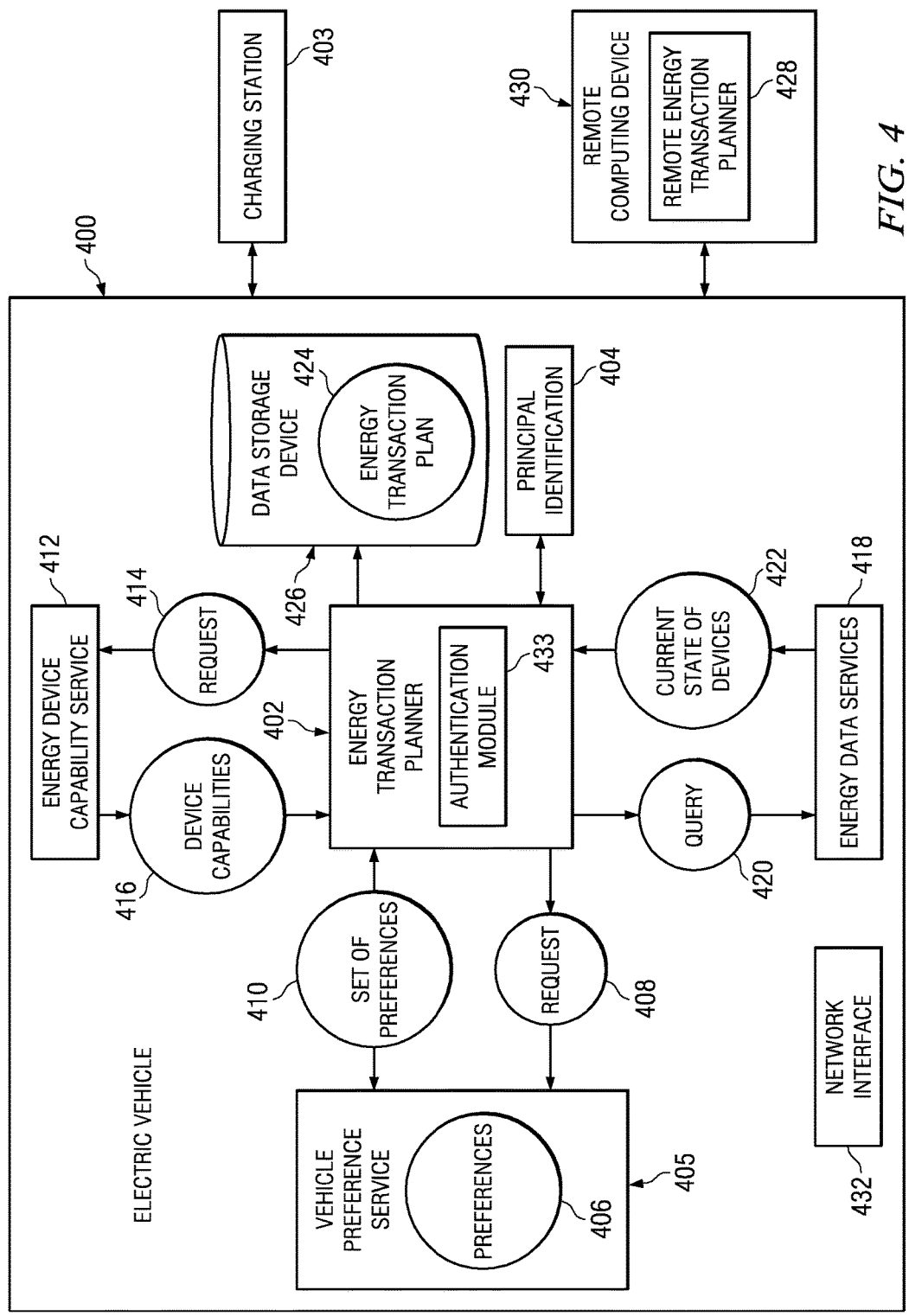
FIG. 4 is a block diagram of an energy transaction planner on-board an electric vehicle in accordance with an illustrative embodiment.

Turning now to FIG. 4, a block diagram of an energy transaction planner on-board an electric vehicle is shown in accordance with an illustrative embodiment. Electric vehicle 400 is an electric vehicle that relies in whole or in part on electricity to drive the vehicle, such as, without limitation, electric vehicle 116 in FIG. 1. Energy transaction planner 402 is a software component that creates a transaction plan for controlling a charging transaction for electric vehicle 400 coupled to charging station 403, such as energy transaction planner 310 in FIG. 3. Charging station 403 is a station or kiosk for permitting electric vehicle 400 to connect to an electric grid to charge or de-charge electric vehicle, such as charging station 118 in FIG. 1.

A charging transaction is a transaction that involves at least one of charging the electric vehicle, storing electric power in an electric storage mechanism associated with the electric vehicle, and/or de-charging the electric vehicle. De-charging refers to removing or drawing electric power from electric vehicle 400 and returning the electric power to a power grid associated with charging station 403. As used herein the phrase "at least one of" when used with a list of items means that different combinations of one or more of the items may be used and only one of each item in the list is needed.

For example, at least one of charging the electric vehicle, storing electric power in an electric storage mechanism, and de-charging the electric vehicle may include, for example and without limitation, only charging the electric vehicle or a combination of charging the electric vehicle and storing electric power in an electric storage mechanism associated with the electric vehicle. This example also may include a transaction that involves any combination of charging the electric vehicle, storing electric power in an electric storage mechanism associated with the electric vehicle, and de-charging the electric vehicle. In addition, the charging, storing, and de-charging may occur more than one time during a given charging transaction. For example, during a single transaction, the electric vehicle may be de-charged, then charged, used to store electric power in the electric storage mechanism for a given time, then de-charged for a second time, and after a given time period, the electric vehicle may be re-charged again. All these occurrences of charging, storing, and de-charging may occur in a single charging transaction or in a series of two or more charging transactions.

Energy transaction planner 402 gathers information from a variety of sources necessary for it to calculate and structure a complete energy transaction plan in preparation for an energy transfer transaction to or from electric vehicle 400 and/or to or from the electric grid at a selected charge/discharge site, such as charging station 403.

Energy transaction planner 402 requests an identification of all principals associated with a charging transaction from one or more components, such as principal identification 404. Principal identification 404 is a component to identify one or more principals. A principal is any entity that may have an interest or role in the energy transaction, including but not limited to the vehicle operator, owner, charging kiosk, utilities associated with any or all of the other principals. The owner and operator of electric vehicle 400 may be the same person or the owner and operator of the vehicle may be different people. Principal identification 404 may include a badge reader, a radio frequency identification tag reader, a biometric device, a prompt requesting a password and/or user login, or any other type of identification mechanism. The biometric device may include, without limitation, a fingerprint scanner, a thumbprint scanner, a palm scanner, a voice print analysis tool, a retina scanner, an iris scanner, a device for reading deoxyribonucleic acid (DNA) patterns of the user, or any other type of biometric identification device.

Likewise, the identification of the user may include, without limitation, a user name, a password, a personal identification (PIN) number, an identifier, a fingerprint, a thumbprint, a retinal scan, an iris scan, or any other type of identification. The identification is associated with the set of preferences to map the set of preferences with the identification of the user that created the set of preferences. In another embodiment, security authentication, authorization, and/or identification information for the principal's identity may also be provided. The identification of an operator of electric vehicle 400 may also be accomplished via the driver preference settings available on electric vehicle 400.

Principal identification 404 may also authenticate users of vehicle preference service 405 that requests input/access to vehicle preference service 405 to create, update, modify, delete, view, or otherwise access their electric vehicle charging preferences, such as for example and without limitation, to initiate a planning phase. Vehicle preference service 405 is a software component for creating, managing, storing, requesting, updating, and/or retrieving preferences 406 for electric vehicle 400. Preferences 406 may include preferences for a single principal, as well as preferences for two or more principals.

In this embodiment, vehicle preference service 405 is included within or bolted on electric vehicle 400. In other words, vehicle preference service 405 is a preference service that is a system incorporated within electric vehicle 400 or added onto electric vehicle 400 as an after-market component. For example, and without limitation, vehicle preference service 405 may be added onto an electric vehicle as an add-on in a manner similar to the way in which global position system (GPS) navigation systems are added on to vehicles. In another embodiment, a given principal associated with the electric vehicle charging transaction may utilize an energy preference service that is located on a computing device that is remote from electric vehicle 400 to create and/or manage preferences for the given principal. In this example, the remote energy preference service communicates with energy transaction planner 402 through a wired or wireless network connection.

Preferences 406 are choices selected by one or more principals setting preferences for managing, governing, and/or controlling one or more aspects of an electric vehicle charging transaction. Energy transaction planner 402 utilizes one or more preferences of interest to a particular charging transaction to create a charging transaction plan to control the charging, de-charging, or storing of electric power associated with electric vehicle 400. In other words, a preference specifies a parameter or aspect of the charging transaction that is to be minimized, maximized, or optimized. It will be appreciated by one skilled in the art that the words "optimize", "optimization" and related terms are terms of art that refer to improvements in speed, efficiency, accuracy, quality, and/or improvement of one or more parameters of electric vehicle charging transactions, and do not purport to indicate that any parameter of the charging transaction has achieved, or is capable of achieving, an "optimal" or perfectly speedy, perfectly efficient, and/or completely optimized state.

Each preference may optionally be associated with a weighting value. Energy transaction planner 402 identifies the weighting value associated with each preference in set of preferences 410. The weighting value indicates a priority of each preference relative to other preferences in the set of preferences. If two or more preferences in set of preferences 410 are conflicting preferences, energy transaction planner 402 uses the weighting value to determine which preference is given priority. In other words, energy transaction planner 402 uses the weighting value to determine the extent to which each preference will be maximized, minimized or optimized.

For example, a preference may specify that charging at charging stations that obtain power from environmentally friendly, "green", wind farms is to be maximized while charging at charging stations that obtain power from "brown", coal powered plants that may be harmful to the environment and should be minimized. Brown energy refers to power generated from polluting sources, as opposed to green energy that is produced from renewable or less polluting energy sources.

Preferences 406 may also specify the price per kilowatt hour the user is willing to pay to charge the electric vehicle, identify certain charging stations the user prefers to fully charge electric vehicle 400 and identify other charging stations at which the user prefers to partially charge electric vehicle 400, perhaps due to proximity to the user's home or due to the source of the electricity used by charging station 403. For example, preferences may indicate that charging when the price per kilowatt hour is less than thirteen cents is to be maximized and charging when prices are higher than thirteen cents per kilowatt hour is to be minimized or prohibited all together. In another example, preferences 406 may specify a limit, such as, without limitation, buy electricity up to a certain price or optimize the cost of the return trip home given the current prices of gas and electricity.

Preferences 406 may be static, dynamic, or temporary preferences. A static preference is a preference that is effective until the user changes the preference. A static preference may be referred to as a default preference. A dynamic preference is a preference that does not have a predetermined value. A dynamic preference requires a user to enter a value for the dynamic preference in real time as the set of preferences responsive to the request of energy transaction planner 402. Thus, if a preference for the operator of the vehicle charging electric vehicle 400 is a dynamic preference, the principal is always prompted to enter a preference value indicating whether a particular operator of electric vehicle 400 is authorized to charge the electric vehicle. A user may choose to make a preference for operator charging electric vehicle 400 a dynamic preference so that the owner of electric vehicle 400 will always be informed of who is attempting to charge electric vehicle 400 and have the option of preventing the charging of electric vehicle 400 in real time prior to commencing of the charging transaction. A temporary preference is a preference that is only valid for a predetermined period of time. When the period of time expires, the temporary preference is invalid and no longer used. For example, a user may set a temporary preference that indicates no charging is to be performed for the next ten minutes at the charging station where the user is parked because the user is only going to be parked for five minutes. At the end of the ten minute time period, the temporary preference expires and electric vehicle 400 can begin charging if the electric vehicle 400 is still parked at the charging station.

Energy transaction planner 402 requests preferences of interest for a particular charging transaction by sending request 408 to vehicle preference service 405 and/or one or more energy preference services located remotely from electric vehicle 400. Request 408 includes an identification of one or more principals and a request for a set of preferences that are of interest to the particular charging transaction. In other words, energy transaction planner 402 does not request every preference for every principal. Instead, energy transaction planner 402 identifies particular principals and requests specific preferences that are needed for creating a transaction plan for a particular charging transaction for those identified principals. In response to request 408, vehicle preference service 405 identifies the requested preferences and retrieves those requested preferences for the identified principals to form set of preferences 410. Vehicle preference service 405 sends set of preferences 410 to energy transaction planner 402. Set of preferences 410 includes a subset of preferences for each principal identified by energy transaction planner 402 in request 408.

Set of preferences 410 may be sent to energy transaction planner 402 over a universal serial bus (USB) or other wired or wireless connection within electric vehicle. Set of preferences 410 may also be transferred to energy transaction planner 402 from a remote energy preference service that is not located on electric vehicle 400. In other words, the energy preference service may be located on a mobile computer, such as a personal digital assistant (PDA), cellular telephone, or laptop computer. The energy preference service may also be located on a remote energy preference server or on a remote client computer. In such cases, set of preferences 410 may be sent to energy transaction planner 402 by the remote energy preference service using a wired or wireless network connection. The remote energy preference service may also save set of preferences 410 onto a removable data storage medium, such as a memory stick, flash memory, or jump drive. When a user plugs the removable data storage medium having set of preferences 410 stored thereon into a removable data storage medium port on electric vehicle 400, vehicle preference service 405 is able to retrieve set of preferences 410 from the removable data storage medium and send set of preference 410 to energy transaction planner 402.

In this example, energy transaction planner 402 sends request 408 to a single energy preference service, such as vehicle preference service 405. However, energy transaction planner 402 may also send multiple requests for preferences of interest to two or more energy preference services located on electric vehicle 400 and/or one or more computing devices. In such a case, energy transaction planner 402 may receive a set of preferences from two or more different energy preference services. For example, energy transaction planner 402 may receive set of preferences 410 from vehicle preference service 405, a second set of preferences from a remote energy preference service on a mobile personal digital assistant (PDA), a third set of preferences from a remote energy preference service on a remote server, and a fourth set of preferences retrieved from a removable data storage device.

A principal may create preferences for managing aspects of the electric vehicle's charging transactions using a user input/output device associated with the computing device hosting the energy preference service. In this embodiment, the principal may use an input/output device located on-board the electric vehicle to create the preferences. In other words, in this embodiment, the principal uses an on-board system for maintaining, inputting, storing, and retrieving preferences that are used to manage the charging, de-charging, and/or storing of electric power associated with the electric vehicle.

Energy device capability service 412 is an application software component that identifies and validates device capabilities of electric vehicle 400, charging station 403, and/or the electric power grid, such as energy device capability server 306 in FIG. 3. Energy transaction planner 402 sends request 414 to energy device capability service 412. Request 414 includes an identification of electric vehicle 400. The request may also include an identification of charging station 403. Energy device capability service 412 identifies device capabilities 416 of electric vehicle 400 and/or charging station 403 and sends device capabilities 416 to energy transaction planner 402. Device capabilities 416 is information describing the capabilities and limitations associated with a particular device, such as, for example and without limitation, information describing the charging capabilities of the charging station, the charging requirements of the electric vehicle, the maximum storage capacity of the batteries on electric vehicle 400, the charging capacity of other on-vehicle storage mechanisms on electric vehicle 400, the existing amount of charge in the storage mechanism on-board electric vehicle 400, the number of amps of electricity charging station 403 is capable of providing to electric vehicle 400, and/or any other information associated with the capabilities and requirements of the electric vehicles and the charging station. Energy transaction plan 424 includes an identification of electric vehicle 400, an identification of the principal paying for the charging and/or the principal that is to be paid for storing electric power or de-charging electric vehicle 400. Energy transaction plan 400 specifies method of payment, amount of payment, incentives, terms of the transaction, and enforcement of the terms of the charging transaction.

Energy transaction plan 424 may be stored on data storage device 426 or sent to another component, such as energy transaction plan approval service 312 or energy transaction execution engine 316 in FIG. 3. Data storage device 426 may be implemented as any type of known or available device for storing data, such as, without limitation, a hard drive, a flash memory, a main memory, read only memory (ROM), a random access memory (RAM), a magnetic or optical disk drive, tape, or any other type of data storage device. Data storage device 426 may be implemented in a single data storage device or a plurality of data storage devices. Data storage device 426 in this example is located locally on electric vehicle 400. However, data storage device 426 may optionally be located in whole or in part on a remote computing device that is accessed by energy transaction planner 402 using a network connection. Data storage device 426 may optionally be used to store preferences 406 locally on electric vehicle 400.

Energy data services 418 provide information describing the current state of one or more devices. The devices may include, without limitation, electric vehicle 400 and/or charging station 403. For example, and without limitation, the state information may describe the current level of charge on one or more batteries on electric vehicle 400, the operational state of one or more charging ports associated with charging station 403, or any other state information. Energy data services 418 may also include information relevant to the energy transaction from third party data sources, such as, without limitation, weather information, traffic information, map and travel information, charging station prices, charging station locations, or any other relevant third party information. Energy data services 418 may obtain the information from a single third party information source, or multiple different third party information sources. Energy transaction planner 402 sends query 420 to energy data services 418 requesting information from one or more third party sources. In response to request 420, energy data services 418 sends current state of devices 422 to energy transaction planner 402.

Energy transaction planner 402 creates energy transaction plan 424 based on set of preferences 410, device capabilities 416, and/or current state of devices 422. In other words, energy transaction planner 402 may utilize user preferences, device capabilities information, and current state information to create energy transaction plan 424 or energy transaction planner 402 may use only preferences and device capabilities if current state information is unavailable. Likewise, if preferences are unavailable, energy transaction planner 402 may create energy transaction plan 424 using only the available device capabilities 416 and current state of devices 422.

Energy transaction plan 424 is a plan that manages every aspect of charging electric vehicle 400, using electric vehicle 400 as a temporary electric storage device, discharging/selling electric power back to the electric grid, or any combination of charging, de-charging, or storing. For example, and without limitation, energy transaction plan 424 may involve charging electric vehicle 400 for two hours, storing the electricity for one hour, de-discharging/selling electricity back to the grid for thirty minutes, waiting two hours and then charging again for one more hour.

Energy transaction plan 424 is created to meet the needs of all the identified principals, is consistent with the capabilities of the physical components of electric vehicle 400, charging 403, and the electric power grid. To construct energy transaction plan 424, a number of the following entities should be specified: a user paying for the charging transaction, the electric vehicle to be charged, the electric vehicle owner, the supplier of electricity, such as a utility, the owner of the charging station or outlet, and additional information related to incentives or credits, such as, for example, a clean energy generation source.

In addition, energy transaction plan 424 optionally determines the contractual relationships between all principals by collecting information from the principals' preferences or from one or more energy data services, such as energy data services 418, where these contractual relationships are managed. Energy transaction planner 402 queries vehicle preference service 405 and energy data services 418 for this information describing the contractual relationships of the principals and the preferences of the principals. Energy transaction planner 402 uses this information to generate energy transaction plan 424. For example, if a contractual relationship allows an operator only to charge electric vehicle 400 and not to discharge or store electric power in electric vehicle 400, then this information factors into the terms of energy transaction plan 424 created by energy transaction planner 402.

In this example, energy transaction planner 402 is located on electric vehicle 400. However, in another embodiment, remote energy transaction planner 428 is located on remote computing device 430 that is not bolted or coupled to electric vehicle 400. In such a case, remote energy transaction planner 428 requests set of preferences 410, device capabilities 416, and/or current state of devices 422 using a network connection. Remote energy transaction planner 428 then transmits energy transaction plan 424 to an energy transaction approval service, an energy transaction execution engine, or a data storage device, such as data storage device 426. Remote energy transaction planner 428 may also store energy transaction plan 424 on a removable data storage device. The removable data storage device is then plugged into electric vehicle 400 or a computing device associated with either the energy transaction approval service or the energy transaction execution engine.

Network interface 432 is any type of network access software known or available for allowing electric vehicle 400 to access a network. Network interface 432 connects to a network connection, such as network 102 in FIG. 1. The network connection permits access to any type of network, such as a local area network (LAN), a wide area network (WAN), or the Internet. Electric vehicle 400 utilizes network interface 432 to connect to remote computing device 430 and/or one or more other remote servers and/or client computing devices. Remote computing device 430 may also include a network interface (not shown) to permit remote computing device to connect to electric vehicle 400 and/or one or more other remote servers and/or clients.

Energy transaction planner 402 may include authentication module 433. Authentication module 433 comprises any type of known or available encryption technology and/or security protocols. Authentication module 433 authenticates and/or encrypts communications between vehicle preference service 405 and energy transaction planner 402. Authentication module 433 may be used to authenticate vehicle preference service 405 itself or authenticate tokens provided by vehicle preference service 405 for each of the principals for which vehicle preference service 405 is providing preferences to energy transaction planner 402.

Authentication module 433 may also be used to authenticate information received from vehicle preference service 405, such as set of preferences 410. In addition, authentication module 433 may be used to identify and authenticate charging station 403 and authenticate information received from charging station 403, such as, without limitation, device capabilities 416 preferences of the owner, operator, utility, and/or financial institution associated with charging station 403, information describing the capabilities of one or more devices associated with charging station 403 and/or information describing the current state of one or more devices associated with charging station 403. This information may only be available from a computing device associated with charging station 403. In such a case, energy transaction planner 402 uses authentication module 433 to identify and authenticate charging station 403 and information exchanged with charging station 403. Remote energy transaction planner 428 may also include an authentication module (not shown) for authenticating communications with electric vehicle 400 and/or one or more other remote computing devices.

Thus, in this illustrative embodiment, the process for generating energy transaction plan 424 begins when electric vehicle 400 arrives at charging station 403 and indicates an intention to charge, de-charge, or store electric energy on electric vehicle 400. Electric vehicle 400 may indicate an intention to begin a charging transaction by plugging into an electric outlet for charging/discharging electric power, selecting an option for charging/discharging electric power at an input/output device associated with charging station 403, informing an operator or attendant of charging station 403, or otherwise indicating a desire to begin a charging transaction.

In response, energy transaction planner 402 obtains set of preferences 410 for all principals that may possibly have an interest in this specific energy transaction from one or more energy transaction preference services, such as, without limitation, vehicle preference service 405, a proxy preference service, a network based preference service located on a remote server, or any other energy preference service. The energy preference services maintain preferences for one or more principals for the purpose of structuring energy transaction plans in accordance with the principals selected requirements, limitations, preferences, and/or constraints on the charging transaction. For example, the present operator of electric vehicle 400 may be an employee of the owner of electric vehicle 400. In this case, the set of principals may include the owner of charging station 403, the operator of electric vehicle 400, the employer that owns electric vehicle 400. Set of preferences 410 in this example includes a subset of preferences for each of these principals.

Energy transaction planner 402 gathers information related to the capabilities of devices involved in this energy transaction from device capability service 412. For example, the charge/discharge kiosk associated with charging station 403 that electric vehicle 400 is connected to, may have a rating for maximum safe amperage that the kiosk can deliver to electric vehicle 400. Conversely, electric vehicle 400 may have maximum amperage that electric vehicle's electric storage mechanisms can safely absorb. Energy transaction planner 402 considers these constraints when structuring energy transaction plan 424.

Energy transaction planner 402 then queries energy data services 418 to determine the current state of the devices participating in this particular charging transaction. For example, the present charge state of the batteries on electric vehicle 400, the present and projected capabilities of the electric grid to deliver and/or accept electric energy at the current time period and for the expected duration of the charging transaction, the present and projected energy rates, including fees and incentives, associated with the charging transaction, as well as any other information associated with the current state of the devices.

Energy transaction planner 402 takes these inputs, including set of preferences 410, device capabilities 416, and current state of device 422, and calculates energy transaction plan 424. Energy transaction planner 402 submits energy transaction plan 424 to an energy transaction execution engine for implementation once the vehicle is connected at the charge/discharge outlet at charging station and/or electric vehicle 402 is authorized to begin charging/discharging after electric vehicle is connected to the outlet. Optionally, prior to submitting energy transaction plan 424 to the execution engine, energy transaction planner 402 may submit energy transaction plan 424 to an energy plan approval service for approval by one or more principals, such as the operator of electric vehicle and/or the operator associated with charging station 403.

Figure 5:
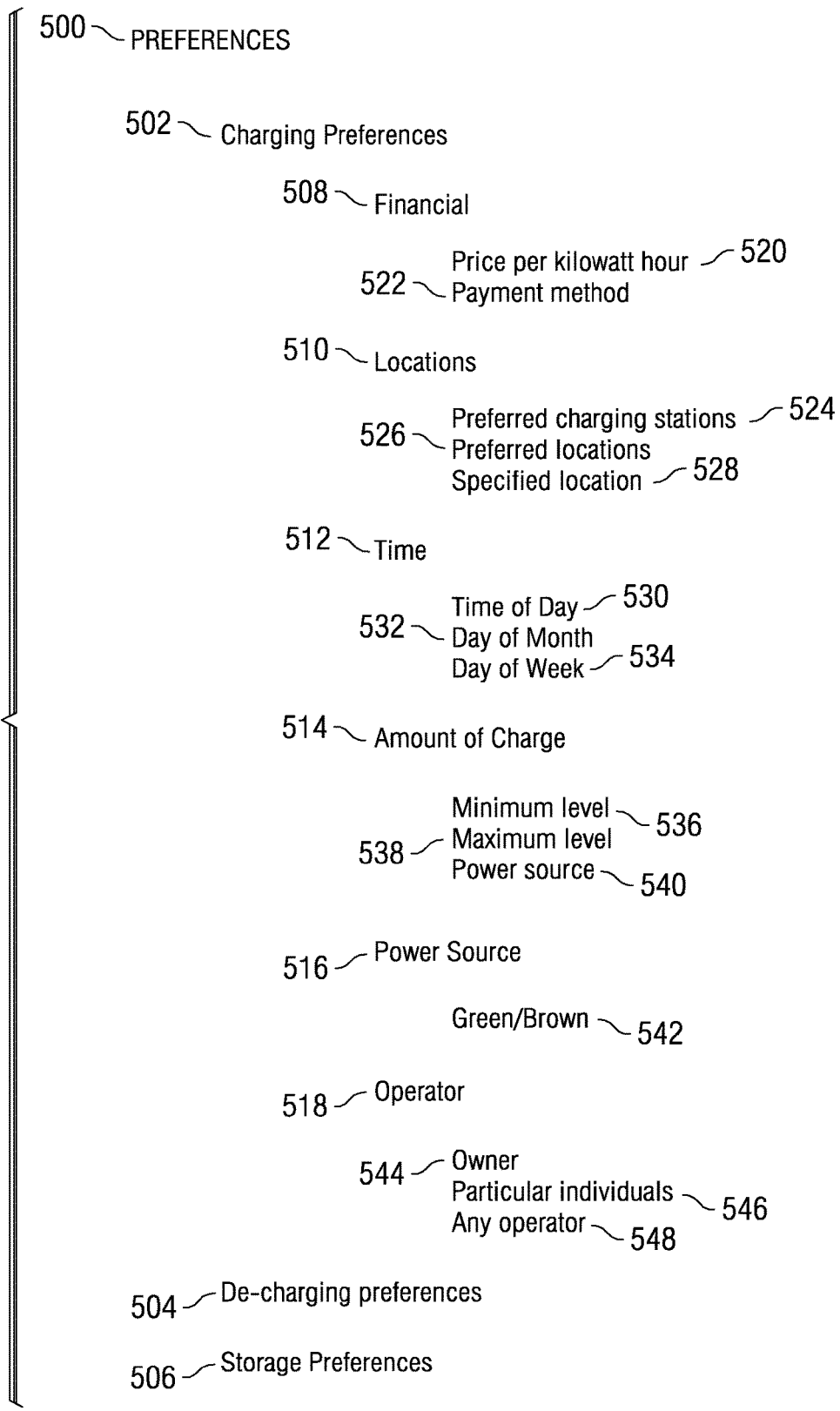
FIG. 5 is a block diagram of electric vehicle charging preferences in accordance with an illustrative embodiment.

Referring to FIG. 5, a block diagram of electric vehicle charging preferences is shown in accordance with an illustrative embodiment. Preferences 500 are types of preferences that may be included within preferences for one or more users, such as preferences 406 in FIG. 4. Preferences 500 may be charging preferences 502 for governing energy transaction to charge an energy storage device associated with the electric vehicle, de-charging preferences 504 for governing energy transactions for de-charging or depleting the energy stored in an energy storage device, or storage preferences 506 for governing the storage of electricity in the electric vehicle's energy storage mechanisms.

A user may wish to de-charge or transfer power from the electric vehicle to a charging station if the price of the electricity is higher than when the electricity was purchased and stored in the electric vehicle. For example, if a user charges an electric vehicle at night when the price of the electricity is only nine cents per kilowatt hour, the user may wish to de-charge or provide electricity from the electric vehicle back to the charging station at noon when the price per kilowatt hour is fifteen cents because the user is able to make a profit from storing the electricity in the electric vehicle until the price of electricity increases and then selling the electricity back to the electric grid.

Some examples of charging preferences include, without limitation, financial 508, locations 510, time 512, amount of charge 514, power source 516, and/or operator 518. For example, financial 508 preferences may specify price per kilowatt hour 520 that the user is willing to pay to charge the electric vehicle or payment method 522 for purchasing the electricity from the charging station and/or the electricity grid. Payment method 522 may include, without limitation, credit cards, cash, debit card, credit, or any other type of payment. The payment type preferences may even specify a particular credit card or bank account for debit to pay for the charging transaction.

Locations 510 preferences may specify preferred charging station 524, preferred locations 526 of the charging stations, and/or specified locations 528 for charging. For example, the user may specify that any time the electric vehicle is parked at a charging station that is at a specified location, the electric vehicle is not to be charged at all, to be charged to a particular charge level, or to be fully charged. The user may wish to set these preferences because the charging stations are a given distance from the user's home or workplace, due to past service received at the charging station, or any other factors.

Time 512 preferences may specify, without limitation, time of day 530 for charging the vehicle, time of day to stop charging the vehicle, day of month 532 for charging, and/or day of the week 534 for charging the electric vehicle.

Amount of charge 514 preferences may specify minimum level 536 of charge in the electric vehicle's storage device, a maximum level of charge 538, or specify different levels of charge depending on power source 540 of the electricity used to charge the electric vehicle. If the power source is a "green" source, such as solar power, the user may specify a higher charge level than if the power source is a more environmentally harmful, or "brown" power source, such as coal or oil.

Power source 516 preferences specify types of power sources that are acceptable or preferred and/or provide weighting values for different power sources. The power sources may be identified as "green" or "brown" 542. The power sources may also be identified specifically by the type of power source, such as wind, solar, coal, oil, and so forth.

Operator 518 preferences are preferences for allowing particular operators to charge the electric vehicle. Owner 544 is a preference that permits an owner to charge, particular individuals 546 permits identified individuals to charge the vehicle, and any operator 548 is a preference that permits anyone to charge the electric vehicle. The operator 518 preference may permit a user to prevent or impede theft of the electric vehicle. For example, if a user sets owner 544 as a mandatory preference that only permits the owner to charge the electric vehicle, a thief would not be permitted to recharge the electric vehicle. Therefore, a thief may not be able to transport the electric vehicle very far from the location at which the electric vehicle was stolen.

The preferences described for charging preferences 502 are only examples of some preferences that may be used. A vehicle preference service is not required to utilize all of the preferences shown in FIG. 5. Moreover, a vehicle preference service may utilize other preferences not shown in FIG. 5 without departing from the scope of the embodiments. Finally, the preferences shown for charging preferences 502 may also be used as preferences for de-charging preferences 504 and/or storage preferences 506, in addition to other preferences not shown. For example, de-charging preferences 504 may include operator 518 preferences specifying operators that are permitted to de-charge or sell power back to the electric grid, financial 508 specifying prices at which the electricity may be transferred from the electric vehicle and sold back to the electric grid, time 512 when de-charging may occur, amount of charge 514 levels for de-charging, and power source 516 of the power that is de-charged.

Figure 6:
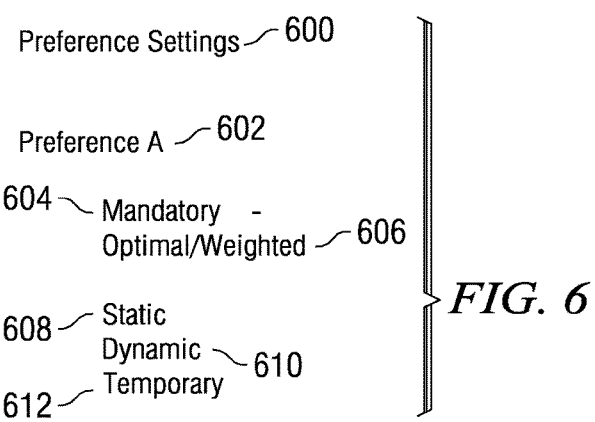
FIG. 6 is a block diagram of preference settings in accordance with an illustrative embodiment.

FIG. 6 is a block diagram of preference settings in accordance with an illustrative embodiment. Preference settings 600 are settings that may be appended to a preference, such as preference A 602. Preference A 602 may be any type of preference, such as, without limitation, financial, locations, time, amount of charge, power source, operator, or any other preferences. Mandatory 604 specifies that the requirements of a particular preference must be met or a charging transaction will not be permitted. For example, if a user sets an operator preference indicating that only the owner is permitted to charge the electric vehicle and the user sets the preference to mandatory, only the owner will be permitted to initiate charging of the electric vehicle. Any other operator of the electric vehicle will not be permitted to charge the electric vehicle unless the owner changes the preference settings.

Optional/weighted 606 is a setting that indicates that a preference is preferred or desirable, but not mandatory. For example, the user may specify that "green" power sources, such as wind and solar power sources, are preferred but not mandatory. In such cases, the energy transaction planner may still permit charging of the electric vehicle at charging stations that utilize electricity provided by coal powered electric generators. The weighting value permits a user to indicate how strongly the user wants a particular preference to be minimized, maximized, or optimized. In the example above, the user may indicate a high weighting value in favor of wind and solar power, a medium weighting value for nuclear power plants, and a low weighting value for coal power plants. The energy transaction planner may then use the weighting value to determine how much to charge or de-charge the electric vehicle or whether to charge or de-charge the electric vehicle at all.

Static 608 indicates that a preference is a default preference that should be used in all cases. A static preference does not change from one charging transaction to the next charging transaction. Dynamic 610 setting indicates that a user wants to provide or select a value or choice for this preference every time a charging transaction plan is generated. A dynamic preference is selected in real time as the charging transaction is commencing. Temporary 612 indicates that a temporary preference value is to be used in place of a static preference for a limited period of time. For example, a user may wish to override a static preference that the electric vehicle should always be fully charged at a particular charging station with a temporary preference indicating that the electric vehicle is not to be charged because the user will only be parked at the charging station for a few minutes.

Figure 7:
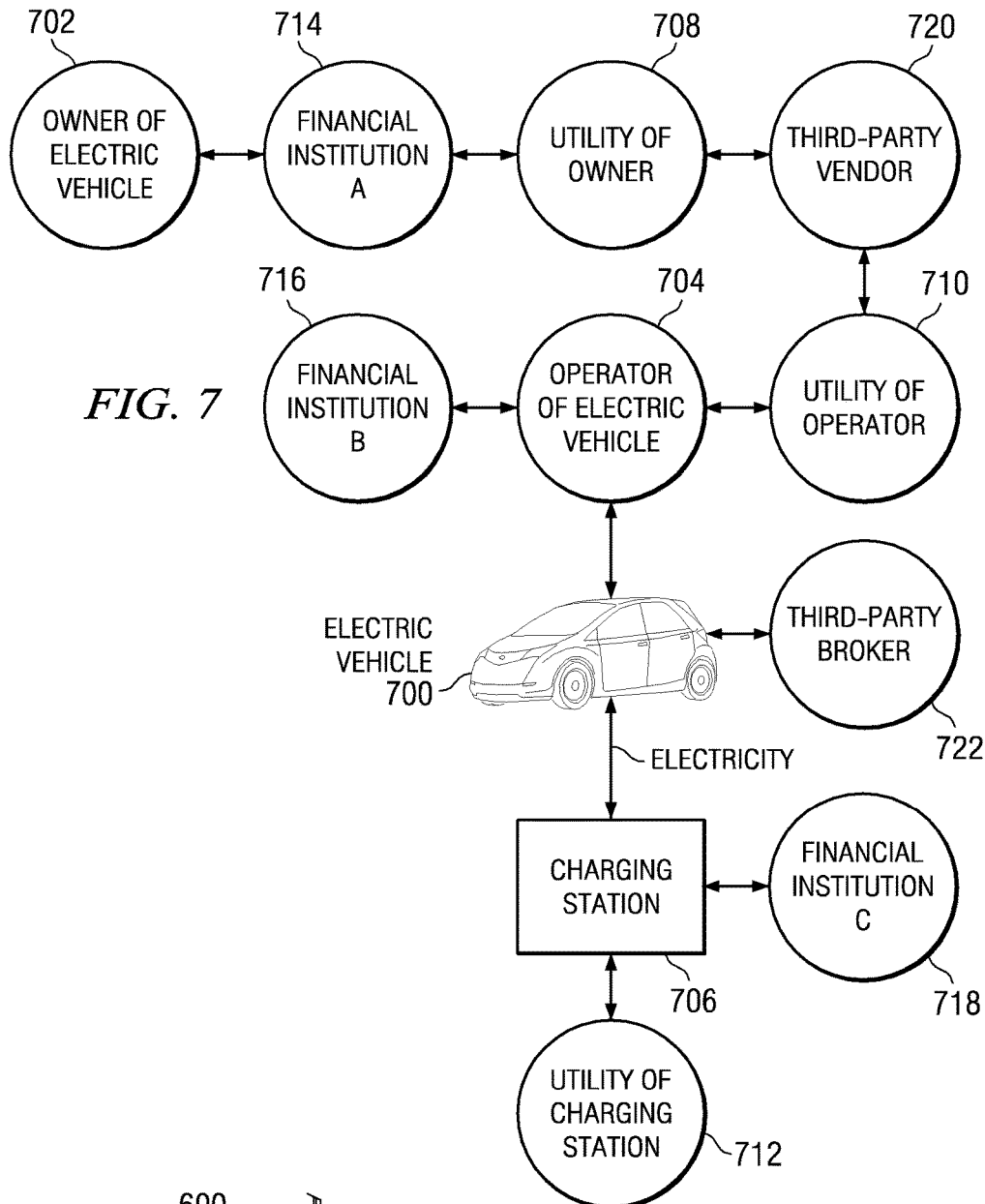
FIG. 7 is a block diagram of parties to an electric vehicle charging transaction in accordance with an illustrative embodiment.

Turning now to FIG. 7, a block diagram of parties to an electric vehicle charging transaction is depicted in accordance with an illustrative embodiment. Each party may have a set of preferences for charging the electric vehicle that is managed by the vehicle preference service. A principal is any entity that may have an interest or role in the energy transaction for charging an electric vehicle, including but not limited to, the vehicle operator, owner of the electric vehicle, the owner of the charging station, the operator of the charging station, financial institutions associated with one or more of the parties, utilities associated with one or more of the principals, or third parties having an interest in the charging transaction. FIG. 7 illustrates the different relationships between principals. Any one or more of the principals shown in FIG. 7 may have preferences stored in the on-vehicle preference service.

Electric vehicle 700 is a vehicle that relies in whole or in part on electric power to drive the vehicle, such as electric vehicle 118 in FIG. 1 or electric vehicle 400 in FIG. 4. Owner of electric vehicle 702 is a principal that creates a set of preferences in vehicle preference service on electric vehicle 700. Operator of electric vehicle 704 is a principal that may be the owner or only someone that has borrowed electric vehicle 700. Each operator may optionally create their own set of preferences in the vehicle preference service on electric vehicle. Charging station 706 is a station or kiosk at which electric vehicle obtains charge or de-charges to provide electricity back to the electric grid, such as charging station 118 in FIG. 1 or charging station 434 in FIG. 4. Charging station 706 may also have a set of preferences for governing the charging of electric vehicle 700.

Each party may have a utility associated with the party. Each utility may also have preferences for governing the charging transaction. For example, utility of owner 708, utility of operator 710, and utility of charging station 712 may each be parties with an interest in the charging transaction and preferences for governing the charging of electric vehicle 700.

Each party may also have a financial institution for paying for the electricity purchased, or for being reimbursed for electricity provided back to the electric grid. A financial institution may be a bank, a credit card company, a broker, a lender, or any other financial institution. For example, financial institution A 714 may be associated with owner of electric vehicle 702, financial institution B 716 may be associated with operator of electric vehicle 704, and financial institution C 718 may be associated with charging station 706. Each of these financial institutions may have preferences for controlling how amounts due are received, how charges of payments are received and accepted, how credits are issued and received, and other aspects of financial transactions associated with charging electric vehicle 700.

Third party vendor 720 is a third party that is not associated with charging station 706 or electric vehicle 700. For example, and without limitation, third party vendor 720 may be a grocery store, a convenience store, a car wash, a repair shop, or any other type of vendor. Third party broker 722 is a third party that may provide financing or manage financial transactions associated with charging electric vehicle 700.

Each of the parties shown in FIG. 7 may optionally have preferences, constraints, limitations, or requirements associated with charging electric vehicle 700. The vehicle preference service on electric vehicle 700 may optionally store, manage, and retrieve some or all of these preferences, constraints, limitations, and requirements in data storage device on electric vehicle 700. The vehicle preference service retrieves the information of interest that is responsive to a request by an energy transaction planner and sends the preferences of interest to the energy transaction planner for use in generating a plan to govern the charging of electric vehicle 700 at charging station 706.

Figure 8:
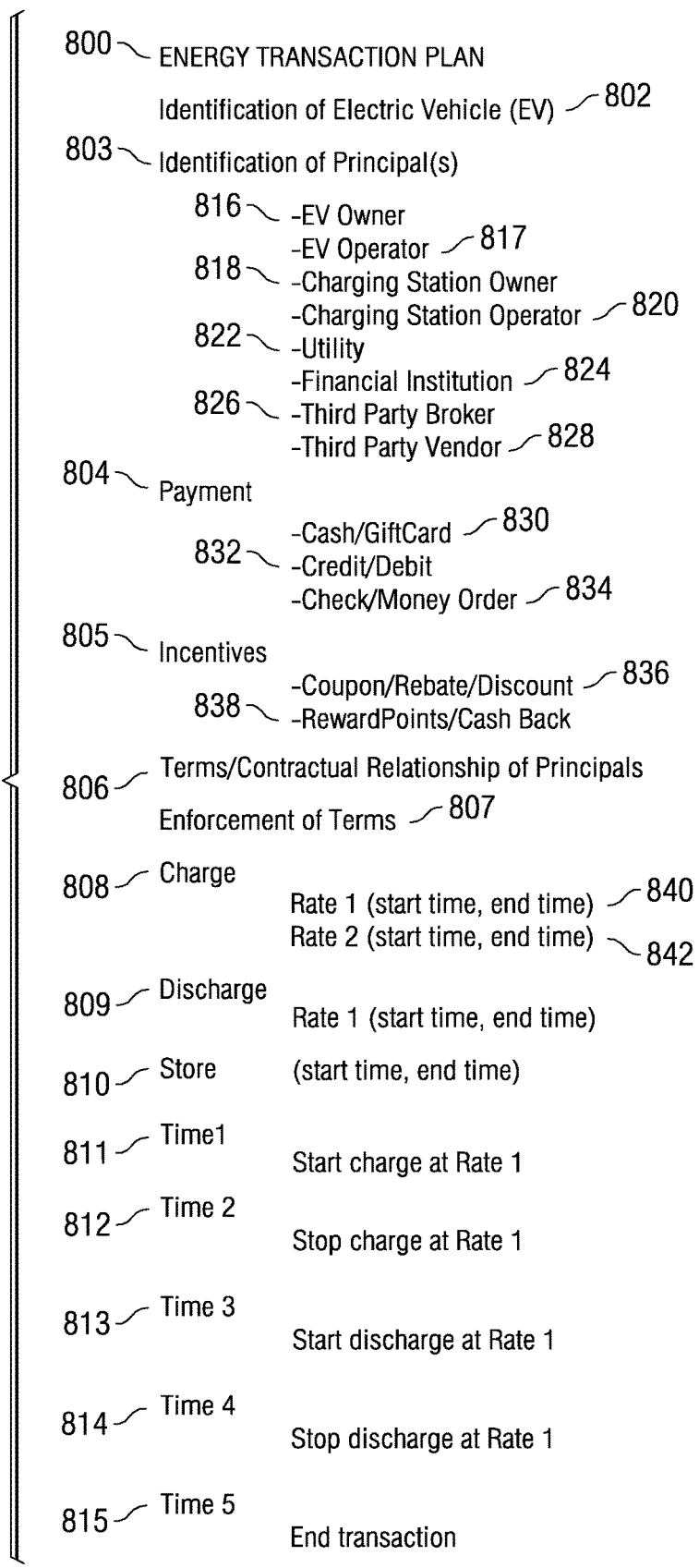
FIG. 8 is a block diagram of a set of fields in an energy transaction plan in accordance with an illustrative embodiment.

FIG. 8 is a block diagram of a set of fields in an energy transaction plan in accordance with an illustrative embodiment. Energy transaction plan 800 is a plan for managing an electric vehicle charging transaction, such as energy transaction plan 424 in FIG. 4. Energy transaction plan 800 defines an energy transfer transaction encompassing the charge, discharge, and storage of electric energy in an electric vehicle and the incumbent financial exchanges related to those energy exchanges and storage of electric power in the electric vehicle. Energy transaction plan 800 may include, without limitation, identification of electric vehicle 802; identification of principal(s) 803; payment 804 terms; incentives 805; terms/contractual relationship of the principals 806; enforcement of terms 807; charge 808, discharge 809, store 810, and/or a series of time fields indicating the electric flow direction at each time mark, such as, without limitation, time 1 811, time 2 812, time 3 813, time 4 814, and/or time 5 815.

Identification of principal(s) 803 identifies one or more principals for a particular charging transaction, such as, without limitation, electric vehicle (EV) owner 816; electric vehicle operator 817; charging station owner 818; charging station operator 820; utility 822 of the owner; operator; or charging station; financial institution 824 of the owner; operator; or utility; third party broker 826; and/or a third party vendor 828.

Payment 804 may specify the type of payment method, such as, without limitation, cash/gift card 830; credit/debit 832; and/or check/money order 834. Incentives 805 are terms in energy transaction plan 800 associated with coupons/rebates/discounts 836, and/or reward points/cash back 838, or any other rewards, discounts, rebates, coupons, or other benefits.

Charge 808 orders the flow direction of electricity from the charging station into the electric vehicle during one or more specified time intervals. Rate 1 840 is a first time interval during which the electric vehicle receives electricity from the charging station at a specified rate of electricity flow. Rate 2 842 is a second time interval during which the electric vehicle receives electricity from the charging station at a specified rate. Discharge 809 indicates each time interval during which electricity flows out of the electric vehicle and back into the electric grid through the charging station. Store 810 indicates time intervals during which electricity is neither flowing into the electric vehicle nor flowing out of the electric vehicle's electricity storage mechanisms. In other words, during the one or more time intervals indicated in store 810, the electric vehicle stores electricity in the electric vehicle's storage mechanisms without charging or discharging power.

The time intervals 811-815 optionally indicate start and end times for charging, discharging, and/or storing. Energy transaction plan 800 may have multiple charge, discharge or store time windows. In this example, and without limitation, time 1 811 starts charging the electric vehicle at a given rate of electricity flow until time 2 812. At time 2 812, charging stops. At time 3 813, the electric vehicle begins discharging power back to the electric grid and continues discharging electricity until time 4 814. Time 5 815 indicates a time when the electric vehicle charging transaction ends. However, the embodiments are not limited to this example. The field for time 1 811 may have been an entry for discharging the electric vehicle instead of charging. The field for time 4 814 may be a field for storing electric power.

Fields 808-815 are examples of charging transaction time driven event sequences. The time intervals may be any standard clock time, such as Greenwich Mean Time, Central Time, Pacific Time, an internal clock time for the electric vehicle, or any other standard clock time. In another embodiment, the time may be a time relative to beginning the electric vehicle charging transaction. For example, instead charge 808 stating that charging begins at 2:24 p.m. and ends at 4:24 p.m., charge 808 may state that charging begins when the charging transaction begins and ends two hours later, regardless of what time it may be.

Energy transaction plan 800 is not required to include every field shown in FIG. 8. For example, and without limitation, energy transaction plan 800 may include fields for charge 808, discharge 809, and store 810 but omit fields for time entries, such as time 1 to time 5 811-815. In addition, energy transaction plan 800 may include additional fields not shown in FIG. 8. For example, energy transaction plan may include a time 5 to begin storing electricity, time 6 to stop storing, time 7 to charge, time 8 to stop charging, time 9 to discharge, time 10 to stop discharging, and time 11 to end the transaction. In other words, energy transaction plan 800 may include any number of fields and any combination of fields to provide terms for charging, discharging, and/or storing electricity in an electric vehicle.

Figure 9:
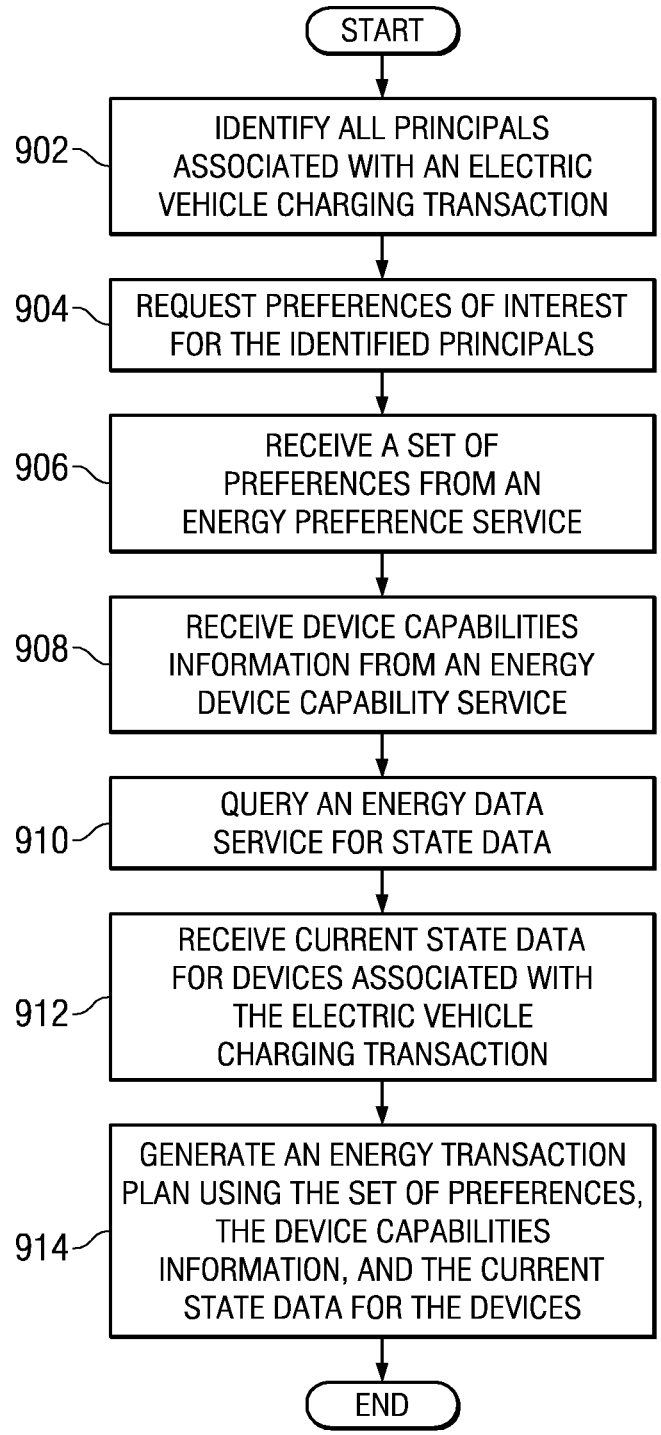
FIG. 9 is flowchart illustrating a process for generating an energy transaction plan in accordance with an illustrative embodiment.

Turning now to FIG. 9, a flowchart illustrating a process for generating an energy transaction plan is shown in accordance with an illustrative embodiment. The process in FIG. 9 is implemented by software for generating energy transaction plans, such as energy transaction planner 402 in FIG. 4.

The process begins by identifying all principals associated with an electric vehicle charging transaction (step 902). The principals associated with the electric vehicle charging transaction are the entities having an interest in the charging transaction. The energy transaction planner requests preferences of interest for the identified principals (step 904). The energy transaction planner receives a set of preferences from an energy preference service (step 906). The energy transaction planner receives device capabilities information from an energy device capability service (step 908). The energy transaction planner queries an energy data service for state data (step 910). The energy transaction planner receives current state data for devices associated with the electric vehicle charging transaction (step 912). The energy transaction planner generates an energy transaction plan using the set of preferences, the device capabilities information, and the current state data fro the device (step 914) with the process terminating thereafter.

Figure 10:
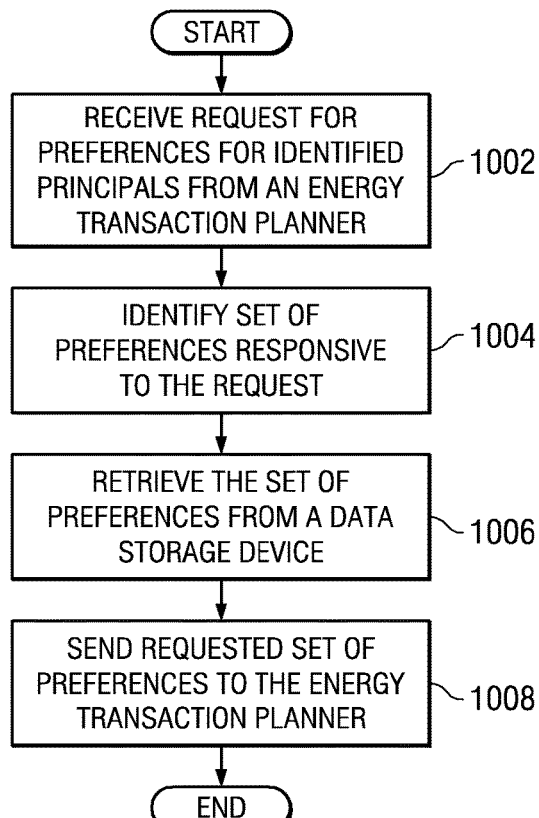
FIG. 10 is a flowchart illustrating a process for requesting preferences from an energy preference service in accordance with an illustrative embodiment.

FIG. 10 is a flowchart illustrating a process for requesting preferences from an energy preference service in accordance with an illustrative embodiment. The process in FIG. 10 is implemented by a software component for creating, managing, and retrieving electric vehicle charging preferences, such as, without limitation, energy preference service 302 in FIG. 3, vehicle preference service 405 in FIG. 4, an off-vehicle preference service, a proxy preference service, or any other type of energy preference service.

The process begins by receiving a request for preferences for identified principals from an energy transaction planner (step 1002). The energy preference service identifies a set of preferences responsive to the request (step 1004). The energy preference service retrieves the set of preferences from a data storage device associated with the energy preference service (step 1006). The set of preferences includes a subset of preferences for each principal. The energy preference service sends the set of requested preferences to the energy transaction planner (step 1008) with the process terminating thereafter.

Figure 11:
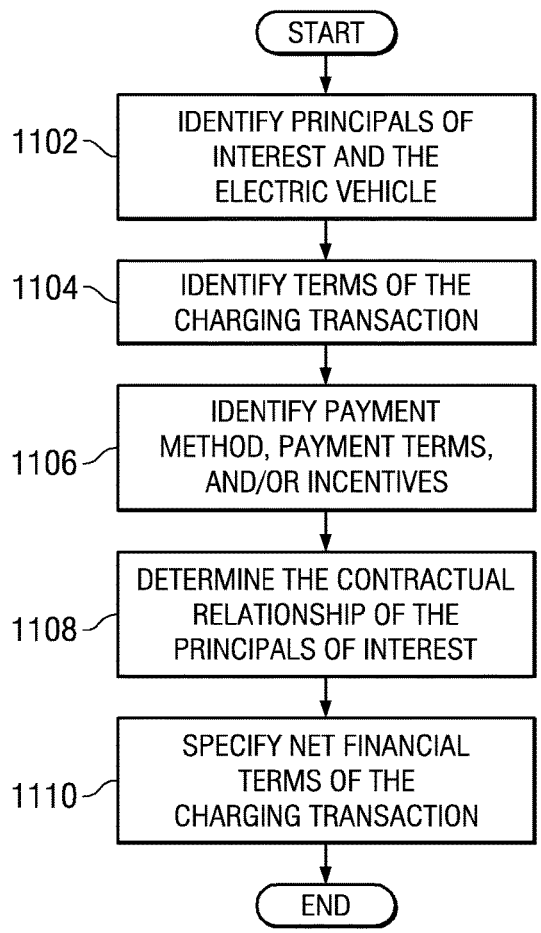
FIG. 11 is a flowchart illustrating a process for identifying terms of a charging transaction for utilization in generating an energy transaction plan in accordance with an illustrative embodiment.

FIG. 11 is a flowchart illustrating a process for identifying terms of a charging transaction for utilization in generating an energy transaction plan in accordance with an illustrative embodiment. The process in FIG. 11 is implemented by software for generating energy transaction plans, such as energy transaction planner 402 in FIG. 4.

The process begins by identifying principals of interest and identifying the electric vehicle (step 1102). The energy transaction planner identifies the terms of the charging transaction (step 1104) in the energy transaction plan. The energy transaction planner identifies the payment method, payment terms, and/or incentives (step 1106) associated with the charging transaction in the energy transaction plan. The energy transaction planner determines the contractual relationship of the principals of interest (step 1108) based on the preferences and the energy data services information. The contractual relationships of the principals include rules that govern the energy transaction planner as the energy transaction planner builds the energy transaction plan. The energy transaction planner specifies the net financial terms of the charging transaction in the energy transaction plan (step 1110) with the process terminating thereafter. The net financial terms may optionally include, without limitation, non-monetary terms, such as incentives, carbon credits, rewards, discounts, and other non-monetary commodities.

According to one embodiment of the present invention, a computer implemented method, apparatus, and computer program product for generating an energy transaction plan to manage an electric vehicle charging transaction is provided. The energy transaction planner identifies an electric vehicle associated with a charging station and a set of principals associated with a charging transaction for the electric vehicle. A principal in the set of principals is an entity having an interest in the charging transaction for the electric vehicle, and wherein the charging transaction is a transaction associated with at least one of charging the electric vehicle, storing electric power in an electric storage mechanism associated with the electric vehicle, and de-charging the electric vehicle. The energy transaction planner receives charging transaction information. The charging transaction information comprises requirements, constraints, and preferences applicable to the charging transaction. The energy transaction planner generates an energy transaction plan based on the charging transaction information. The energy transaction plan comprises an identification of the electric vehicle, an identification of a principal in the set of principals to pay for the charging transaction, an identification of at least one utility associated with the charging transaction, an owner of the charging station, and terms of the charging transaction.

The energy transaction plan identifies principals and facilities involved in an electric vehicle charging transaction and the terms of the principals' involvement in the charging transaction. The energy transaction plan identifies when to charge an electric vehicle, when to discharge electric power from the electric vehicle back to the power grid, where to charge or discharge the electric vehicle, takes into account the location of the electric vehicle, the destination of the electric vehicle, the time of use price for electric power charging or discharging to sell electric power back to the utility, identifies the capabilities of the electric vehicle, the power grid, and the charging station. The terms of the energy transaction plan remain in effect for the duration of the charging transaction to ensure that the charging transaction occurs in accordance with the terms of the charging transaction. If an anomaly occurs, the charging transaction may be terminated to prevent the charging transaction from deviating from the terms of the energy transaction plan.

Generation and utilization of this energy transaction plan enables users to dramatically broaden the potential availability of charging facilities and the flexibility of charge transactions business. The owners of charging facilities may actively facilitate access to their charging facilities if energy transaction plans are utilized to control charging transaction to assure the owners are assured of reimbursement for the energy delivered to customers.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of generating an energy transaction plan for controlling aspects of an electric vehicle charging transaction, the computer implemented method comprising:
    identifying, by a processor in the computer, an electric vehicle associated with a charging station and a set of principals associated with a charging transaction for the electric vehicle, wherein a principal in the set of principals is an entity having an interest in the charging transaction for the electric vehicle including an owner and an operator the electric vehicle and wherein the charging transaction is a transaction associated with at least one of charging the electric vehicle, storing electric power in an electric storage mechanism associated with the electric vehicle, and de-charging the electric vehicle;
    receiving charging transaction information, by the processor in the computer, wherein the charging transaction information comprises requirements, constraints, and preferences applicable to the charging transaction, wherein the preferences comprise at least one user-selected preference having a type specified as one of static, effective until an associated preference changes; dynamic, requiring user input of a value in real time; and temporary, effective for a predetermined period of time, with the preferences used to manage, govern, and control one or more aspects of the electric vehicle charging transaction so as to minimize, maximize, or optimize the aspects, and further the preferences are maintained in a vehicle preference service comprised of a software component for creating, managing, storing, requesting, updating, deleting, and retrieving the preferences according to the energy transaction plan;
    identifying, by the processor in the computer, a weighting value associated with each preference, wherein the weighting value indicates a priority of each preference relative to other preferences and determines an extent to which an associated preference is minimized, maximized, or optimized;

generating, by the processor in the computer, an energy transaction plan to control all aspects of the charging, discharging, and storing operations with the electric vehicle based on the charging transaction information, wherein the energy transaction plan comprises an identification of the electric vehicle, an identification of a principal in the set of principals to pay for the charging transaction, an identification of at least one electric power provider associated with the charging transaction, an owner of the charging station, charging transaction time driven event sequences that indicate the electric flow direction relative to the electric vehicle and rate of flow at each of a time mark and that specifies start and end times for the charging transaction and controls each of charging, discharging, and storing operations with the electric vehicle, and includes terms of the charging transaction to account for each of charging, discharging, and storing electric power, and further the energy transaction plan maximizes, minimizes, or optimizes each preference in accordance with the weighting value assigned to each preference, to control charging, discharging, and storing electric power; and starting, conducting, and ending charging of the electric vehicle charging transaction using the processor in the computer configured to execute the generated energy transaction plan to control all aspects of the charging, discharging, and storing operations with the electric vehicle.

2. The computer implemented method of claim 1 wherein the charging transaction information comprises a set of preferences for the set of principals, wherein the set of preferences comprises a subset of preferences for each principal in the set of principals, wherein a preference in the set of preferences specifies a parameter of the charging transaction that is to be minimized, maximized, or optimized.

3. The computer implemented method of claim 1 wherein the charging transaction information comprises current state information describing a current state of one or more devices associated with the electric vehicle and the charging station.

4. The computer implemented method of claim 1 wherein the charging transaction information comprises device capabilities information, wherein the device capabilities information describes capabilities of devices associated with at least one of the electric vehicle and the charging station.

5. The computer implemented method of claim 1 wherein the charging transaction time driven event sequences comprises information identifying time intervals for at least one of charging the electric vehicle, discharging the electric vehicle, storing electricity in the electric vehicle, and rates of electricity flow between the charging station and the electric vehicle during the charging of the electric vehicle or discharging of the electric vehicle.

6. The computer implemented method of claim 1 wherein the energy transaction plan further comprises net financial results of the charging transaction, wherein the net financial results indicate parties that will get paid, amounts of payments to be made, an amount of electricity provided to the electric vehicle from an electric grid, and the amount of electricity provided to the electric grid from the electric vehicle.

7. The computer implemented method of claim 1 wherein the energy transaction plan further comprises information describing incentives associated with the charging transaction, wherein an incentive is a benefit or reward.

8. A computer implemented method of generating an energy transaction plan for controlling aspects of an electric vehicle charging transaction, the computer implemented method comprising:

identifying, by a processor in the computer, an electric vehicle associated with a charging station and a set of principals associated with a charging transaction for the electric vehicle, wherein a principal in the set of principals is an entity having an interest in the charging transaction for the electric vehicle including an owner and an operator of the electric vehicle, and wherein the charging transaction is a transaction associated with at least one of charging the electric vehicle, storing electric power in an electric storage mechanism associated with the electric vehicle, and de-charging the electric vehicle;

receiving, by the processor in the computer, a set of preferences for the set of principals, wherein the set of preferences comprises a subset of preferences for each principal in the set of principals, wherein a preference in the set of preferences specifies a parameter of the charging transaction that is to be minimized, maximized, or optimized, and wherein the preferences comprise at least one user-selected preference having a type specified as one of static, effective until an associated preference changes; dynamic requiring user input of a value in real time; and temporary, effective for a predetermined period of time, and further the preferences are maintained in a vehicle preference service comprised of a software component for creating, managing, storing, requesting, updating, deleting, and retrieving the preferences according to the energy transaction plan;

identifying, by the processor in the computer, a weighting value associated with each preference in the set of preferences, wherein the weighting value indicates a priority of each preference relative to other preferences in the set of preferences and determines an extent to which an associated preference is minimized, maximized, or optimized; and generating, by the processor in the computer, an energy transaction plan to control all aspects of the charging, discharging, and storing operations with the electric vehicle based on the set of preferences, wherein the energy transaction plan comprises a set of terms for governing aspects of the charging transaction based on the set of preferences, and the energy transaction plan maximizes, minimizes, or optimizes each preference in accordance with the weighting value, and wherein the charging transaction is implemented and completed in accordance with the terms of the charging transaction to start, conduct, and end charging of the electric vehicle using the processor in the computer configured to execute the generated energy transaction plan;

wherein the energy transaction plan includes charging transaction time driven event sequences that indicate the electric flow direction relative to the electric vehicle and rate of flow at each of a time mark and that specifies start and end times for the charging transaction and controls each of charging, discharging, and storing operations with the electric vehicle.

9. The computer implemented method of claim 8 further comprising:

receiving device capabilities information for the electric vehicle and the charging station, wherein the energy transaction plan is generated based on the set of preferences and the device capabilities information.

10. The computer implemented method of claim 8 further comprising:
receiving current state information for the electric vehicle and the charging station, wherein the energy transaction plan is generated based on the set of preferences and the current state information.

11. The computer implemented method of claim 8 further comprising:
sending a request for the set of preferences to a set of energy preference services, wherein the set of energy preference services sends preferences for the set of principals that are responsive to the request to an energy transaction planner to form the set of preferences.

12. The computer implemented method of claim 8 wherein the energy transaction plan is generated by an energy transaction planner comprising one of:
a computing device in the electric vehicle; or a remote computing device.

13. The computer implemented method of claim 8 wherein the energy transaction plan comprises an identification of the electric vehicle, an identification of a principal in the set of principals to pay for the charging transaction, an identification of at least one electric power provider associated with the charging transaction, an owner of the charging station, charging transaction time driven event sequences, and terms of the charging transaction.

14. The computer implemented method of claim 8 wherein each principal in the set of principals is selected from a group consisting of an operator of the electric vehicle, an owner of the electric vehicle, an owner of a charging station, an operator of the charging station, an electric power provider of the owner of the electric vehicle, an electric power provider of the operator of the electric vehicle, an electric power provider of the owner of the charging station, a financial institution, and a third party broker.

15. A computer program product comprising:
a non-transitory computer recordable storage medium including computer readable program code stored thereon, when executed by a processor of the computer, for controlling aspects of an electric vehicle charging transaction, said computer program product comprising:
computer readable program code for identifying an electric vehicle associated with a charging station and a set of principals associated with a charging transaction for the electric vehicle, wherein a principal in the set of principals is an entity having an interest in the charging transaction for the electric vehicle including an owner and an operator of the electric vehicle, and wherein the charging transaction is a transaction associated with at least one of charging the electric vehicle, storing electric power in an electric storage mechanism associated with the electric vehicle, and de-charging the electric vehicle;
computer readable program code for receiving charging transaction information, wherein the charging transaction information comprises requirements, constraints, and preferences applicable to the charging transaction, wherein the preferences comprise at least one user-selected preference having a type specified as one of static, effective until an associated preference changes; dynamic requiring user input of a value in real time; and temporary, effective for a predetermined period of time, with the preferences used to manage, govern, and control one or more aspects of the electric vehicle charging transaction so as to minimize, maximize, or optimize the aspect, and further the preferences are maintained in a vehicle preference service comprised of a software component for creating, managing, storing, requesting, updating, deleting, and retrieving the preferences according to the energy transaction plan;
computer readable program code for identifying a weighting value associated with each preference, wherein the weighting value indicates a priority of each preference relative to other preferences and determines an extent to which an associated preference is minimized, maximized, or optimized; and
computer readable program code for generating an energy transaction plan to control all aspects of the charging, discharging, and storing operations with the electric vehicle based on the charging transaction information, wherein the energy transaction plan comprises an identification of the electric vehicle, an identification of a principal in the set of principals to pay for the charging transaction, an identification of at least one electric power provider associated with the charging transaction, an owner of the charging station, charging transaction time driven event sequences that indicate the electric flow direction relative to the electric vehicle and rate of flow at each of a time mark that specifies start and end times for the charging transaction and controls each of charging, discharging, and storing operations with the electric vehicle, and includes terms of the charging transaction, and the energy transaction plan maximizes, minimizes, or optimizes each preference in accordance with the weighting value assigned to each preference, to control charging, discharging, and storing electric power; and
computer readable program code for starting, conducting, and ending charging of the electric vehicle charging transaction using a computer processor configured with program code to execute the generated energy transaction plan to control all aspects of the charging, discharging, and storing operations with the electric vehicle.

16. The computer program product of claim 15 wherein the charging transaction information comprises at least one of a set of preferences for the set of principals, wherein the set of preferences comprises a subset of preferences for each principal in the set of principals, wherein a preference in the set of preferences specifies a parameter of the charging transaction that is to be minimized, maximized, or optimized.

17. The computer program product of claim 15 wherein the charging transaction time driven event sequences comprises information identifying time intervals for at least one of charging the electric vehicle, discharging the electric vehicle, storing electricity in the electric vehicle, and rates of electricity flow between the charging station and the electric vehicle during the charging of the electric vehicle or discharging of the electric vehicle.

18. A computer program product comprising:
a non-transitory computer recordable storage medium including computer readable program code stored thereon, when executed by a processor of the computer, for controlling aspects of an electric vehicle charging transaction, said computer program product comprising:
computer readable program code for identifying an electric vehicle associated with a charging station and a set of principals associated with a charging transaction for the electric vehicle, wherein a principal in the set of principals is an entity having an interest in the charging transaction for the electric vehicle including an owner and an operator of the electric vehicle, and wherein the charging transaction is a transaction associated with at least one of charging the electric vehicle, storing electric power in an electric storage mechanism associated with the electric vehicle, and de-charging the electric vehicle;

computer readable program code for receiving a set of preferences for the set of principals, wherein the set of preferences comprises a subset of preferences for each principal in the set of principals, wherein a preference in the set of preferences specifies a parameter of the charging transaction that is to be minimized, maximized, or optimized, and wherein the preferences comprise at least one user-selected preference having a type specified as one of static, effective until an associated preference changes; dynamic requiring user input of a value in real time; and temporary, effective for a predetermined period of time and further the preferences are maintained in a vehicle preference service comprised of a software component for creating, managing, storing, requesting, updating, deleting, and retrieving the preferences according to the energy transaction plan;

computer readable program code for identifying a weighting value associated with each preference in the set of preferences, wherein the weighting value indicates a priority of each preference relative to other preferences in the set of preferences and determines an extent to which an associated preference is minimized, maximized, or optimized;

computer readable program code for generating an energy transaction plan to control all aspects of the charging, discharging, and storing operations with the electric vehicle based on the set of preferences, wherein the energy transaction plan comprises a set of terms for governing aspects of the charging transaction based on the set of preferences, and the energy transaction plan maximizes, minimizes, or optimizes each preference in accordance with the weighting value, and wherein the charging transaction is implemented and completed in accordance with the terms of the charging transaction to start, conduct, and end charging of the electric vehicle using the processor of the computer configured to execute the generated energy transaction plan;

wherein the energy transaction plan includes charging transaction time driven event sequences that indicate the electric flow direction relative to the electric vehicle and rate of flow at each of a time mark and that specifies start and end times for the charging transaction and controls each of charging, discharging, and storing operations with the electric vehicle.

19. The computer program product of claim 18 wherein the energy transaction plan comprises an identification of the electric vehicle, an identification of a principal in the set of principals to pay for the charging transaction, an identification of at least one electric power provider associated with the charging transaction, an owner of the charging station, charging transaction time driven event sequences, and terms of the charging transaction.

20. The computer program product of claim 18 further comprising:
computer usable program code for receiving device capabilities information for the electric vehicle and the charging station, wherein the energy transaction plan is generated based on the set of preferences and the device capabilities information.

21. The computer program product of claim 18 further comprising:
computer usable program code for receiving current state information for the electric vehicle and the charging station, wherein the energy transaction plan is generated based on the set of preferences and the current state information.

22. A system for generating an energy transaction plan to govern an electric vehicle charging transaction, the system comprising:
a system bus;
one or more memory elements coupled to the system bus, having stored thereon computer readable program code;
one or more processors coupled to the system bus wherein the one or more processors execute the computer usable program code to direct the system to:
identify, using a principal identifier, a set of principals associated with a charging transaction for an electric vehicle, wherein a principal in the set of principals is an entity having an interest in the charging transaction for the electric vehicle including an owner and an operator of the electric vehicle, and wherein the charging transaction is a transaction associated with at least one of charging the electric vehicle, storing electric power in an electric storage mechanism associated with the electric vehicle, and de-charging the electric vehicle;
receive, using an energy transaction planner, charging transaction information from a set of sources, wherein the charging transaction information comprises requirements, constraints, and preferences applicable to the charging transaction, wherein the preferences manage, govern, and control one or more aspects of the electric vehicle charging transaction so as to minimize, maximize, or optimize the aspect and a weighting value is associated with each preference, wherein the weighting value indicates a priority of each preference relative to other preferences and determines an extent to which an associated preference is minimized, maximized, or optimized, and generate an energy transaction plan, using the energy transaction planner, based on the charging transaction information, and wherein the preferences further comprise at least one user-selected preference having a type of one of static, effective until an associated preference changes; dynamic requiring user input of a value in real time; and temporary, effective for a predetermined period of time and are maintained in a vehicle preference service comprised of a software component for creating, managing, storing, requesting, updating, deleting, and retrieving the preferences according to the energy transaction plan, wherein the energy transaction plan controls all aspects of the charging, discharging, and storing operations with the electric vehicle and comprises an identification of the electric vehicle, an identification of a principal in the set of principals to pay for the charging transaction, an identification of at least one electric power provider associated with the charging transaction, an owner of a charging station, charging transaction time driven event sequences that indicate the electric flow direction relative the electric vehicle and rate of flow at each of a time mark with start and end times for charging, discharging, and storing operations with the electric vehicle, a determination of the extent to which each preference is maximized, minimized, or optimize according to the weighting value, and terms of the charging transaction that comprises charging, storing, and de-charging.

23. The system of claim 22 wherein the one or more processors executes the computer usable program code to further direct the system to:

send, using an energy preference service, a set of preferences for the set of principals to the energy transaction planner to form the charging transaction information, wherein the set of preferences comprises a subset of preferences for each principal in the set of principals, and wherein a preference in the set of preferences specifies a parameter of the charging transaction that is to be minimized, maximized, or optimized.

24. The system of claim 22 wherein the one or more processors executes the computer usable program code to further direct the system to:

send, using a device capabilities service, device capabilities information for the electric vehicle and the charging station to the energy transaction planner to form the charging transaction information, wherein the energy transaction plan is generated based on the device capabilities information.

25. The system of claim 22 wherein the one or more processors executes the computer usable program code to further direct the system to:

send, using a current state device, current state information for the electric vehicle and the charging station to the energy transaction planner to form the charging transaction information, wherein the energy transaction plan is generated based on the current state information.

* * * * *